(12) United States Patent
Zhao

(10) Patent No.: US 12,134,333 B2
(45) Date of Patent: Nov. 5, 2024

(54) POWER CONTROL METHOD AND SYSTEM FOR BATTERY CHARGING AND SWAP STATION, MEDIUM, APPARATUS, AND BATTERY CHARGING AND SWAP STATION

(71) Applicant: NIO TECHNOLOGY (ANHUI) CO., LTD, Hefei (CN)

(72) Inventor: Jincheng Zhao, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 52 days.

(21) Appl. No.: 18/061,550

(22) Filed: Dec. 5, 2022

(65) Prior Publication Data
US 2023/0173940 A1    Jun. 8, 2023

(30) Foreign Application Priority Data

Dec. 8, 2021   (CN) .......................... 202111493675.0

(51) Int. Cl.
*B60L 53/67*   (2019.01)
*B60L 53/16*   (2019.01)
(Continued)

(52) U.S. Cl.
CPC .............. *B60L 53/67* (2019.02); *B60L 53/16* (2019.02); *B60L 53/62* (2019.02); *B60L 53/63* (2019.02); *B60L 53/80* (2019.02)

(58) Field of Classification Search
CPC .......... B60L 53/67; B60L 53/16; B60L 53/62; B60L 53/63; B60L 53/80; B60L 53/14;
(Continued)

(56) References Cited

U.S. PATENT DOCUMENTS

2023/0173938 A1*   6/2023   Zhao ............... H02J 7/0013
                                              320/109

\* cited by examiner

*Primary Examiner* — Richard Tan
(74) *Attorney, Agent, or Firm* — Sheridan Ross P.C.

(57) ABSTRACT

The disclosure relates to the technical field of battery charging and swapping, and in particular, to a power control method and system for a battery charging and swap station, a medium, an apparatus, and the battery charging and swap station. The disclosure is intended to solve the problem of how to implement integrated power management of the battery charging and swap station. To this end, the power control method in the disclosure includes: obtaining a power limit of the battery charging and swap station, a station-side total requested power of a battery swap station, and a pile-side total requested power of a number of charging piles; calculating a sum of the station-side total requested power and the pile-side total requested power; comparing the power limit with the sum of the two powers; when the power limit is less than the sum of the two powers, determining, based on a preset allocation strategy, a station-side actual allocated power for the battery swap station and a pile-side actual allocated power for the number of charging piles; and respectively performing, based on the station-side actual allocated power and the pile-side actual allocated power, power allocation on one or more battery compartments and the number of charging piles. The disclosure can implement flexible and efficient power allocation between the battery swap station and the charging piles in the battery charging and swap station.

18 Claims, 4 Drawing Sheets

(51) Int. Cl.
  *B60L 53/62* (2019.01)
  *B60L 53/63* (2019.01)
  *B60L 53/80* (2019.01)
(58) Field of Classification Search
  CPC ........ B60L 53/30; B60L 53/305; B60L 53/31;
       B60L 53/60; Y02T 10/70; Y02T 10/7072;
       Y02T 90/12; Y02T 90/14; Y02T 90/16
  USPC .......................................................... 307/18
  See application file for complete search history.

POWER CONTROL METHOD AND SYSTEM FOR BATTERY CHARGING AND SWAP STATION, MEDIUM, APPARATUS, AND BATTERY CHARGING AND SWAP STATION

CROSS-REFERENCE TO RELATED APPLICATIONS

This application claims the benefit of China Patent Application No. 202111493675.0 filed Dec. 8, 2021, the contents of which are incorporated herein by reference in its entirety.

TECHNICAL FIELD

The disclosure relates to the technical field of battery charging and swapping, and in particular, to a power control method and system for a battery charging and swap station, a medium, an apparatus, and the battery charging and swap station.

BACKGROUND

With the development and gradual improvement of the electric vehicle industry, more and more consumers have a tendency for choosing electric vehicles as a means of transportation. With the continuous increase in the vehicle population of electric vehicles, requirements for energy replenishment of the electric vehicles are increasing accordingly, and various energy replenishment devices are continuously emerging. A battery swap station and a high-power direct-current charging pile are important facilities capable of implementing rapid power replenishment at present.

Compared with separately built charging piles or battery swap stations, an integrated battery charging and swap station which is built by combining the two can meet a diverse power replenishment needs of users. However, more power replenishment device investment means that a larger battery capacity is required, the battery capacity cannot be provided indefinitely. Therefore, integrated power management of the charging pile and the battery swap station needs to be done well.

Thus, it is very necessary to provide a control method that can implement the integrated management of the charging power of the charging pile and the battery swap station.

BRIEF SUMMARY

To solve at least one of the above problems in the prior art, that is, to solve the problem of how to implement integrated power management of a battery charging and swap station, the disclosure provides a power control method for the battery charging and swap station. The battery charging and swap station includes a battery swap station and a number of charging piles, the battery swap station is provided with one or more battery compartments, the battery compartment is configured to charge a traction battery, the charging pile includes a charging gun, and the charging gun is capable of being in plug-in connection with a charging socket provided on a new energy vehicle, so as to charge the new energy vehicle; and the power control method includes:

obtaining a power limit of the battery charging and swap station, a station-side total requested power of the battery swap station, and a pile-side total requested power of the number of charging piles;

calculating a sum of the station-side total requested power and the pile-side total requested power;

comparing the power limit with the sum of the two powers;

when the power limit is less than the sum of the two powers, determining, based on a preset allocation strategy, a station-side actual allocated power for the battery swap station and a pile-side actual allocated power for the number of charging piles; and respectively performing, based on the station-side actual allocated power and the pile-side actual allocated power, power allocation on the one or more battery compartments and the number of charging piles.

In a preferred technical solution of the above power control method for the battery charging and swap station, the step of "determining, based on a preset allocation strategy, a station-side actual allocated power for the battery swap station and a pile-side actual allocated power for the number of charging piles" further includes:

determining a station-side pre-allocated power for the battery swap station and a pile-side pre-allocated power for the number of charging piles;

comparing the station-side pre-allocated power with the station-side total requested power and comparing the pile-side pre-allocated power with the pile-side total requested power; and determining, based on a comparison result, the station-side actual allocated power and the pile-side actual allocated power.

In a preferred technical solution of the above power control method for the battery charging and swap station, the step of "determining, based on a comparison result, the station-side actual allocated power and the pile-side actual allocated power" further includes:

if the station-side pre-allocated power is greater than or equal to the station-side total requested power, determining that the station-side actual allocated power is the station-side total requested power and the pile-side actual allocated power is a difference between the power limit and the station-side total requested power;

if the pile-side pre-allocated power is greater than or equal to the pile-side total requested power, determining that the pile-side actual allocated power is the pile-side total requested power and the station-side actual allocated power is a difference between the power limit and the pile-side total requested power; and if the station-side pre-allocated power is less than the station-side total requested power and the pile-side pre-allocated power is less than the pile-side total requested power, determining that the station-side actual allocated power is the station-side pre-allocated power and the pile-side actual allocated power is the pile-side pre-allocated power.

In a preferred technical solution of the above power control method for the battery charging and swap station, the station-side pre-allocated power and the pile-side pre-allocated power are determined by using the method indicated by the following formulas:

$$Pscmd = N \times a + Pswap, \text{ and}$$

$$Pccmd = PL - Pscmd,$$

where Pscmd is the station-side pre-allocated power; N is a number of required batteries; a is a power constant; Pswap is non-charging power consumption of an in-station power consuming device in the battery swap station; Pccmd is the pile-side pre-allocated power; and PL is the power limit.

In a preferred technical solution of the above power control method for the battery charging and swap station, when the station-side actual allocated power is the station-side total requested power and the pile-side actual allocated power is the difference between the power limit and the station-side total requested power, the step of "respectively performing, based on the station-side actual allocated power and the pile-side actual allocated power, power allocation on the one or more battery compartments and the number of charging piles" further includes:

performing power allocation on each battery compartment based on its compartment-side requested power;

performing, based on the pile-side actual allocated power, equal power allocation on each charging pile;

determining whether there is redundancy in a pile-side actual power obtained by each charging pile; and if there is redundancy, secondarily allocating a redundant power of the charging pile that has a pile-side actual power with redundancy to the charging pile that has a pile-side actual power without redundancy.

In a preferred technical solution of the above power control method for the battery charging and swap station, when the pile-side actual allocated power is the pile-side total requested power and the station-side actual allocated power is the difference between the power limit and the pile-side total requested power, the step of "respectively performing, based on the station-side actual allocated power and the pile-side actual allocated power, power allocation on the one or more battery compartments and the number of charging piles" further includes:

performing power allocation on each charging pile based on its pile-side requested power;

performing, based on the station-side actual allocated power, equal power allocation on each battery compartment;

determining whether there is redundancy in a compartment-side actual power obtained by each battery compartment; and if there is redundancy, secondarily allocating a redundant power of the battery compartment that has a compartment-side actual power with redundancy to the battery compartment that has a compartment-side actual power without redundancy.

In a preferred technical solution of the above power control method for the battery charging and swap station, when the station-side actual allocated power is the station-side pre-allocated power and the pile-side actual allocated power is the pile-side pre-allocated power, the step of "respectively performing, based on the station-side actual allocated power and the pile-side actual allocated power, power allocation on the one or more battery compartments and the number of charging piles" further includes:

performing, based on the station-side actual allocated power, equal power allocation on each battery compartment;

determining whether there is redundancy in a compartment-side actual power obtained by each battery compartment;

if there is redundancy, secondarily allocating a redundant power of the battery compartment that has a compartment-side actual power with redundancy to the battery compartment that has a compartment-side actual power without redundancy;

performing, based on the pile-side actual allocated power, equal power allocation on each charging pile;

determining whether there is redundancy in a pile-side actual power obtained by each charging pile; and if there is redundancy, secondarily allocating a redundant power of the charging pile that has a pile-side actual power with redundancy to the charging pile that has a pile-side actual power without redundancy.

In a preferred technical solution of the above power control method for the battery charging and swap station, the station-side total requested power of the battery swap station is determined in the following manner:

obtaining a number N of required batteries;

selecting N batteries with a highest state of charge from the battery swap station;

calculating a total charging requested power of the N batteries;

calculating non-charging power consumption of an in-station power consuming device in the battery swap station; and calculating a sum of the total charging requested power and the non-charging power consumption as the station-side total requested power, where the number of required batteries is determined based on a reserved battery swap order of the battery swap station.

In a preferred technical solution of the above power control method for the battery charging and swap station, the power control method further includes:

obtaining a real-time total power of the battery charging and swap station;

comparing the real-time total power with the power limit; and when the real-time total power is greater than the power limit, controlling a total power of the battery charging and swap station to be reduced to the power limit.

In a preferred technical solution of the above power control method for the battery charging and swap station, the power control method further includes:

obtaining a communication status of the charging pile; and if there is a charging pile in a disconnected state, allocating a preset power to the charging pile; and/or obtaining a communication status of the battery compartment; and if there is a battery compartment in a disconnected state, deactivating the battery compartment and selecting a battery compartment corresponding to a battery with a highest state of charge from the remaining battery compartments to perform power allocation.

The disclosure further provides a power control system for a battery charging and swap station. The battery charging and swap station includes a battery swap station and a number of charging piles, the battery swap station is provided with one or more battery compartments, the battery compartment is configured to charge a traction battery, the charging pile includes a charging gun, and the charging gun is capable of being in plug-in connection with a charging socket provided on a new energy vehicle, so as to charge the new energy vehicle; and the power control system includes:

an obtaining module configured to obtain a power limit of the battery charging and swap station, a station-side total requested power of the battery swap station, and a pile-side total requested power of the number of charging piles;

a calculation module configured to calculate a sum of the station-side total requested power and the pile-side total requested power;

a comparison module configured to compare the power limit with the sum of the two powers;

a power determination module configured to determine, when the power limit is less than the sum of the two powers, based on a preset allocation strategy, a station-side actual allocated power for the battery swap station and a pile-side actual allocated power for the number of charging piles; and a power allocation module configured to respectively perform, based on the station-side actual allocated power and the pile-side actual allocated power, power allocation on the one or more battery compartments and the number of charging piles.

In a preferred technical solution of the above power control system for the battery charging and swap station, the power determination module is further configured to determine, based on the preset allocation strategy, the station-side actual allocated power for the battery swap station and the pile-side actual allocated power for the number of charging piles in the following manner:

determining a station-side pre-allocated power for the battery swap station and a pile-side pre-allocated power for the number of charging piles;

comparing the station-side pre-allocated power with the station-side total requested power and comparing the pile-side pre-allocated power with the pile-side total requested power; and determining, based on a comparison result, the station-side actual allocated power and the pile-side actual allocated power.

In a preferred technical solution of the above power control system for the battery charging and swap station, the power determination module is further configured to determine, based on the comparison result, the station-side actual allocated power and the pile-side actual allocated power in the following manner:

if the station-side pre-allocated power is greater than or equal to the station-side total requested power, determining that the station-side actual allocated power is the station-side total requested power and the pile-side actual allocated power is a difference between the power limit and the station-side total requested power;

if the pile-side pre-allocated power is greater than or equal to the pile-side total requested power, determining that the pile-side actual allocated power is the pile-side total requested power and the station-side actual allocated power is a difference between the power limit and the pile-side total requested power; and if the station-side pre-allocated power is less than the station-side total requested power and the pile-side pre-allocated power is less than the pile-side total requested power, determining that the station-side actual allocated power is the station-side pre-allocated power and the pile-side actual allocated power is the pile-side pre-allocated power.

In a preferred technical solution of the above power control system for the battery charging and swap station, the power determination module is further configured to determine the station-side pre-allocated power and the pile-side pre-allocated power by using the method indicated by the following formulas:

$$Pscmd = N \times a + Pswap, \text{ and}$$

$$Pccmd = PL - Pscmd,$$

where Pscmd is the station-side pre-allocated power; N is a number of required batteries; a is a power constant; Pswap is non-charging power consumption of an in-station power consuming device in the battery swap station; Pccmd is the pile-side pre-allocated power; and PL is the power limit.

In a preferred technical solution of the above power control system for the battery charging and swap station, when the station-side actual allocated power is the station-side total requested power and the pile-side actual allocated power is the difference between the power limit and the station-side total requested power, the power allocation module is further configured to respectively perform, based on the station-side actual allocated power and the pile-side actual allocated power, power allocation on the one or more battery compartments and the number of charging piles in the following manner:

performing power allocation on each battery compartment based on its compartment-side requested power;

performing, based on the pile-side actual allocated power, equal power allocation on each charging pile;

determining whether there is redundancy in a pile-side actual power obtained by each charging pile; and if there is redundancy, secondarily allocating a redundant power of the charging pile that has a pile-side actual power with redundancy to the charging pile that has a pile-side actual power without redundancy.

In a preferred technical solution of the above power control system for the battery charging and swap station, when the pile-side actual allocated power is the pile-side total requested power and the station-side actual allocated power is the difference between the power limit and the pile-side total requested power, the power allocation module is further configured to respectively perform, based on the station-side actual allocated power and the pile-side actual allocated power, power allocation on the one or more battery compartments and the number of charging piles in the following manner:

performing power allocation on each charging pile based on its pile-side requested power;

performing, based on the station-side actual allocated power, equal power allocation on each battery compartment;

determining whether there is redundancy in a compartment-side actual power obtained by each battery compartment; and if there is redundancy, secondarily allocating a redundant power of the battery compartment that has a compartment-side actual power with redundancy to the battery compartment that has a compartment-side actual power without redundancy.

In a preferred technical solution of the above power control system for the battery charging and swap station, when the station-side actual allocated power is the station-side pre-allocated power and the pile-side actual allocated power is the pile-side pre-allocated power, the power allocation module is further configured to respectively perform, based on the station-side actual allocated power and the pile-side actual allocated power, power allocation on the one or more battery compartments and the number of charging piles in the following manner:

performing, based on the station-side actual allocated power, equal power allocation on each battery compartment;

determining whether there is redundancy in a compartment-side actual power obtained by each battery compartment;

if there is redundancy, secondarily allocating a redundant power of the battery compartment that has a compartment-side actual power with redundancy to the battery compartment that has a compartment-side actual power without redundancy;

performing, based on the pile-side actual allocated power, equal power allocation on each charging pile;

determining whether there is redundancy in a pile-side actual power obtained by each charging pile; and if there is redundancy, secondarily allocating a redundant power of the charging pile that has a pile-side actual power with redundancy to the charging pile that has a pile-side actual power without redundancy.

In a preferred technical solution of the above power control system for the battery charging and swap station, the power control system further includes:

a station-side total requested power determination module configured to determine the station-side total requested power of the battery swap station in the following manner:

obtaining a number N of required batteries;

selecting N batteries with a highest state of charge from the battery swap station;

calculating a total charging requested power of the N batteries;

calculating non-charging power consumption of an in-station power consuming device in the battery swap station; and calculating a sum of the total charging requested power and the non-charging power consumption as the station-side total requested power, where the number of required batteries is determined based on a reserved battery swap order of the battery swap station.

In a preferred technical solution of the above power control system for the battery charging and swap station, the obtaining module is further configured to obtain a real-time total power of the battery charging and swap station;

the comparison module is further configured to compare the real-time total power with the power limit; and the power allocation module is further configured to, when the real-time total power is greater than the power limit, control a total power of the battery charging and swap station to be reduced to the power limit.

In a preferred technical solution of the above power control system for the battery charging and swap station, the obtaining module is further configured to obtain a communication status of the charging pile; and the power allocation module is further configured to allocate, if there is a charging pile in a disconnected state, a preset power to the charging pile; and/or the obtaining module is further configured to obtain a communication status of the battery compartment; and the power allocation module is further configured to, if there is a battery compartment in a disconnected state, deactivate the battery compartment and select a battery compartment corresponding to a battery with a highest state of charge from the remaining battery compartments to perform power allocation.

The disclosure further provides a computer-readable storage medium storing a plurality of program codes, where the program codes are adapted to be loaded and executed by a processor to implement the power control method for the battery charging and swap station according to any one of the above preferred technical solutions.

The disclosure further provides a control apparatus, including:

a processor; and a memory, where the memory is adapted to store a plurality of program codes, and the program codes are adapted to be loaded and executed by the processor to implement the power control method for the battery charging and swap station according to any one of the above preferred technical solutions.

The disclosure further provides a battery charging and swap station, the battery charging and swap station includes a battery swap station and a number of charging piles, and the battery swap station is provided with the control apparatus according to the above preferred technical solution.

In the preferred technical solutions of the disclosure, when the power limit is less than the sum of the station-side total requested power and the pile-side total requested power, by determining the station-side actual allocated power and the pile-side actual allocated power based on the preset allocation strategy, and then performing power allocation on the battery compartments and the charging piles based on the station-side actual allocated power and the pile-side actual allocated power, the disclosure solves the problem of integrated power management of the battery charging and swap station that integrates the battery swap station and the charging piles, implements flexible and efficient power allocation under a limited power, and ensures a service capability.

Further, by first determining the station-side pre-allocated power and the pile-side pre-allocated power and further determining the station-side actual allocated power and the pile-side actual allocated power based on the station-side pre-allocated power and the pile-side pre-allocated power, the control method in the disclosure first performs the total power allocation between the battery swap station and the charging piles, and then performs power allocation among the battery compartments in the battery swap station and power allocation among the charging piles, which ensures the total charging efficiency of the battery swap station and the charging piles at the same time and implements balanced and efficient allocation of the limited power.

Further, when the station-side/pile-side actual allocated power is less than the station-side/pile-side total requested power, the primary and secondary power allocation to the battery compartment/charging pile can make as many devices as possible be operated at the requested power, and make the limited battery capacity used more efficiently.

Further, by determining the number N of required batteries based on the reserved battery swap order of the battery swap station, thereby determining the station-side total requested power, the disclosure can also allocate powers as many as possible to the charging piles, on the premise that the service capability of the battery swap station is not affected, and effectively improve the utilization rate of the battery capacity of the station.

Further, during power allocation, by performing real time monitoring on the real-time total power of the battery charging and swap station, and controlling the power allocation of the battery charging and swap station based on the real-time total power and the power limit, the disclosure can further perform power allocation strictly under the power limit, so as to avoid operation exceeding the power limit from the source, avoid the occurrence of tripping and device damage caused by the over-limited total power of the battery charging and swap station when the charging piles, the battery compartments, and other devices are anomalous, and reduce the operation and maintenance costs of the whole station.

Solution 1. A power control method for a battery charging and swap station, where the battery charging and swap station includes a battery swap station and a number of charging piles, the battery swap station is provided with one or more battery compartments, the battery compartment is configured to charge a traction battery, the charging pile includes a charging gun, and the charging gun is capable of being in plug-in connection with a charging socket provided on a new energy vehicle, so as to charge the new energy vehicle; and the power control method includes:

obtaining a power limit of the battery charging and swap station, a station-side total requested power of the battery swap station, and a pile-side total requested power of the number of charging piles;

calculating a sum of the station-side total requested power and the pile-side total requested power;

comparing the power limit with the sum of the two powers;

when the power limit is less than the sum of the two powers, determining, based on a preset allocation strategy, a station-side actual allocated power for the battery swap station and a pile-side actual allocated power for the number of charging piles; and respectively performing, based on the station-side actual allocated power and the pile-side actual allocated power, power allocation on the one or more battery compartments and the number of charging piles.

Solution 2. The power control method for the battery charging and swap station according to solution 1, where the step of "determining, based on a preset allocation strategy, a station-side actual allocated power for the battery swap station and a pile-side actual allocated power for the number of charging piles" further includes:

determining a station-side pre-allocated power for the battery swap station and a pile-side pre-allocated power for the number of charging piles;

comparing the station-side pre-allocated power with the station-side total requested power and comparing the pile-side pre-allocated power with the pile-side total requested power; and determining, based on a comparison result, the station-side actual allocated power and the pile-side actual allocated power.

Solution 3. The power control method for the battery charging and swap station according to solution 2, where the step of "determining, based on a comparison result, the station-side actual allocated power and the pile-side actual allocated power" further includes:

if the station-side pre-allocated power is greater than or equal to the station-side total requested power, determining that the station-side actual allocated power is the station-side total requested power and the pile-side actual allocated power is a difference between the power limit and the station-side total requested power;

if the pile-side pre-allocated power is greater than or equal to the pile-side total requested power, determining that the pile-side actual allocated power is the pile-side total requested power and the station-side actual allocated power is a difference between the power limit and the pile-side total requested power; and if the station-side pre-allocated power is less than the station-side total requested power and the pile-side pre-allocated power is less than the pile-side total requested power, determining that the station-side actual allocated power is the station-side pre-allocated power and the pile-side actual allocated power is the pile-side pre-allocated power.

Solution 4. The power control method for the battery charging and swap station according to solution 2, where the station-side pre-allocated power and the pile-side pre-allocated power are determined by using the method indicated by the following formulas:

Pscmd=$N \times a$+Pswap, and

Pccmd=$PL$−Pscmd, where Pscmd is the station-side pre-allocated power; N is a number of required batteries; a is a power constant; Pswap is non-charging power consumption of an in-station power consuming device in the battery swap station; Pccmd is the pile-side pre-allocated power; and PL is the power limit.

Solution 5. The power control method for the battery charging and swap station according to solution 3, where when the station-side actual allocated power is the station-side total requested power and the pile-side actual allocated power is the difference between the power limit and the station-side total requested power, the step of "respectively performing, based on the station-side actual allocated power and the pile-side actual allocated power, power allocation on the one or more battery compartments and the number of charging piles" further includes:

performing power allocation on each battery compartment based on its compartment-side requested power;

performing, based on the pile-side actual allocated power, equal power allocation on each charging pile;

determining whether there is redundancy in a pile-side actual power obtained by each charging pile; and if there is redundancy, secondarily allocating a redundant power of the charging pile that has a pile-side actual power with redundancy to the charging pile that has a pile-side actual power without redundancy.

Solution 6. The power control method for the battery charging and swap station according to solution 3, where when the pile-side actual allocated power is the pile-side total requested power and the station-side actual allocated power is the difference between the power limit and the pile-side total requested power, the step of "respectively performing, based on the station-side actual allocated power and the pile-side actual allocated power, power allocation on the one or more battery compartments and the number of charging piles" further includes:

performing power allocation on each charging pile based on its pile-side requested power;

performing, based on the station-side actual allocated power, equal power allocation on each battery compartment;

determining whether there is redundancy in a compartment-side actual power obtained by each battery compartment; and if there is redundancy, secondarily allocating a redundant power of the battery compartment that has a compartment-side actual power with redundancy to the battery compartment that has a compartment-side actual power without redundancy.

Solution 7. The power control method for the battery charging and swap station according to solution 3, where when the station-side actual allocated power is the station-side pre-allocated power and the pile-side actual allocated power is the pile-side pre-allocated power, the step of "respectively performing, based on the station-side actual allocated power and the pile-side actual allocated power, power allocation on the one or more battery compartments and the number of charging piles" further includes:

performing, based on the station-side actual allocated power, equal power allocation on each battery compartment;

determining whether there is redundancy in a compartment-side actual power obtained by each battery compartment;

if there is redundancy, secondarily allocating a redundant power of the battery compartment that has a compartment-side actual power with redundancy to the battery compartment that has a compartment-side actual power without redundancy;

performing, based on the pile-side actual allocated power, equal power allocation on each charging pile;

determining whether there is redundancy in a pile-side actual power obtained by each charging pile; and if there is redundancy, secondarily allocating a redundant power of the charging pile that has a pile-side actual power with redundancy to the charging pile that has a pile-side actual power without redundancy.

Solution 8. The power control method for the battery charging and swap station according to solution 1, where the station-side total requested power of the battery swap station is determined in the following manner:

obtaining a number N of required batteries;

selecting N batteries with a highest state of charge from the battery swap station;

calculating a total charging requested power of the N batteries;

calculating non-charging power consumption of an in-station power consuming device in the battery swap station; and calculating a sum of the total charging requested power and the non-charging power consumption as the station-side total requested power, where the number of required batteries is determined based on a reserved battery swap order of the battery swap station.

Solution 9. The power control method for the battery charging and swap station according to solution 1, where the power control method further includes:

obtaining a real-time total power of the battery charging and swap station;

comparing the real-time total power with the power limit; and when the real-time total power is greater than the power limit, controlling a total power of the battery charging and swap station to be reduced to the power limit.

Solution 10. The power control method for the battery charging and swap station according to solution 1, where the power control method further includes:

obtaining a communication status of the charging pile; and if there is a charging pile in a disconnected state, allocating a preset power to the charging pile; and/or obtaining a communication status of the battery compartment; and if there is a battery compartment in a disconnected state, deactivating the battery compartment and selecting a battery compartment corresponding to a battery with a highest state of charge from the remaining battery compartments to perform power allocation.

Solution 11. A power control system for a battery charging and swap station, where the battery charging and swap station includes a battery swap station and a number of charging piles, the battery swap station is provided with one or more battery compartments, the battery compartment is configured to charge a traction battery, the charging pile includes a charging gun, and the charging gun is capable of being in plug-in connection with a charging socket provided on a new energy vehicle, so as to charge the new energy vehicle; and the power control system includes:

an obtaining module configured to obtain a power limit of the battery charging and swap station, a station-side total requested power of the battery swap station, and a pile-side total requested power of the number of charging piles;

a calculation module configured to calculate a sum of the station-side total requested power and the pile-side total requested power;

a comparison module configured to compare the power limit with the sum of the two powers;

a power determination module configured to determine, when the power limit is less than the sum of the two powers, based on a preset allocation strategy, a station-side actual allocated power for the battery swap station and a pile-side actual allocated power for the number of charging piles; and a power allocation module configured to respectively perform, based on the station-side actual allocated power and the pile-side actual allocated power, power allocation on the one or more battery compartments and the number of charging piles.

Solution 12. The power control system for the battery charging and swap station according to solution 11, where the power determination module is further configured to determine, based on the preset allocation strategy, the station-side actual allocated power for the battery swap station and the pile-side actual allocated power for the number of charging piles in the following manner:

determining a station-side pre-allocated power for the battery swap station and a pile-side pre-allocated power for the number of charging piles;

comparing the station-side pre-allocated power with the station-side total requested power and comparing the pile-side pre-allocated power with the pile-side total requested power; and determining, based on a comparison result, the station-side actual allocated power and the pile-side actual allocated power.

Solution 13. The power control system for the battery charging and swap station according to solution 12, where the power determination module is further configured to determine, based on the comparison result, the station-side actual allocated power and the pile-side actual allocated power in the following manner:

if the station-side pre-allocated power is greater than or equal to the station-side total requested power, determining that the station-side actual allocated power is the station-side total requested power and the pile-side actual allocated power is a difference between the power limit and the station-side total requested power;

if the pile-side pre-allocated power is greater than or equal to the pile-side total requested power, determining that the pile-side actual allocated power is the pile-side total requested power and the station-side actual allocated power is a difference between the power limit and the pile-side total requested power; and if the station-side pre-allocated power is less than the station-side total requested power and the pile-side pre-allocated power is less than the pile-side total requested power, determining that the station-side actual allocated power is the station-side pre-allocated power and the pile-side actual allocated power is the pile-side pre-allocated power.

Solution 14. The power control system for the battery charging and swap station according to solution 12, where the power determination module is further configured to determine the station-side pre-allocated power and the pile-side pre-allocated power by using the method indicated by the following formulas:

$$Pscmd = N \times a + Pswap, \text{ and}$$

$$Pccmd = PL - Pscmd,$$

where Pscmd is the station-side pre-allocated power; N is a number of required batteries; a is a power constant; Pswap is non-charging power consumption of an in-station power consuming device in the battery swap station; Pccmd is the pile-side pre-allocated power; and PL is the power limit.

Solution 15. The power control system for the battery charging and swap station according to solution 13, where when the station-side actual allocated power is the station-side total requested power and the pile-side actual allocated power is the difference between the power limit and the station-side total requested power, the power allocation module is further configured to respectively perform, based on the station-side actual allocated power and the pile-side actual allocated power, power allocation on the one or more battery compartments and the number of charging piles in the following manner:

performing power allocation on each battery compartment based on its compartment-side requested power;

performing, based on the pile-side actual allocated power, equal power allocation on each charging pile;

determining whether there is redundancy in a pile-side actual power obtained by each charging pile; and if there is redundancy, secondarily allocating a redundant power of the charging pile that has a pile-side actual power with redundancy to the charging pile that has a pile-side actual power without redundancy.

Solution 16. The power control system for the battery charging and swap station according to solution 13, where when the pile-side actual allocated power is the pile-side total requested power and the station-side actual allocated power is the difference between the power limit and the pile-side total requested power, the power allocation module is further configured to respectively perform, based on the station-side actual allocated power and the pile-side actual allocated power, power allocation on the one or more battery compartments and the number of charging piles in the following manner:

performing power allocation on each charging pile based on its pile-side requested power;

performing, based on the station-side actual allocated power, equal power allocation on each battery compartment;

determining whether there is redundancy in a compartment-side actual power obtained by each battery compartment; and if there is redundancy, secondarily allocating a redundant power of the battery compartment that has a compartment-side actual power with redundancy to the battery compartment that has a compartment-side actual power without redundancy.

Solution 17. The power control system for the battery charging and swap station according to solution 13, where when the station-side actual allocated power is the station-side pre-allocated power and the pile-side actual allocated power is the pile-side pre-allocated power, the power allocation module is further configured to respectively perform, based on the station-side actual allocated power and the pile-side actual allocated power, power allocation on the one or more battery compartments and the number of charging piles in the following manner:

performing, based on the station-side actual allocated power, equal power allocation on each battery compartment;

determining whether there is redundancy in a compartment-side actual power obtained by each battery compartment;

if there is redundancy, secondarily allocating a redundant power of the battery compartment that has a compartment-side actual power with redundancy to the battery compartment that has a compartment-side actual power without redundancy;

performing, based on the pile-side actual allocated power, equal power allocation on each charging pile;

determining whether there is redundancy in a pile-side actual power obtained by each charging pile; and if there is redundancy, secondarily allocating a redundant power of the charging pile that has a pile-side actual power with redundancy to the charging pile that has a pile-side actual power without redundancy.

Solution 18. The power control system for the battery charging and swap station according to solution 11, where the power control system further includes:

a station-side total requested power determination module configured to determine the station-side total requested power of the battery swap station in the following manner:

obtaining a number N of required batteries;

selecting N batteries with a highest state of charge from the battery swap station;

calculating a total charging requested power of the N batteries;

calculating non-charging power consumption of an in-station power consuming device in the battery swap station; and calculating a sum of the total charging requested power and the non-charging power consumption as the station-side total requested power, where the number of required batteries is determined based on a reserved battery swap order of the battery swap station.

Solution 19. The power control system for the battery charging and swap station according to solution 11, where the obtaining module is further configured to obtain a real-time total power of the battery charging and swap station;

the comparison module is further configured to compare the real-time total power with the power limit; and the power allocation module is further configured to, when the real-time total power is greater than the power limit, control a total power of the battery charging and swap station to be reduced to the power limit.

Solution 20. The power control system for the battery charging and swap station according to solution 11, where the obtaining module is further configured to obtain a communication status of the charging pile; and the power allocation module is further configured to allocate, if there is a charging pile in a disconnected state, a preset power to the charging pile; and/or the obtaining module is further configured to obtain a communication status of the battery compartment; and the power allocation module is further configured to, if there is a battery compartment in a disconnected state, deactivate the battery compartment and select a battery compartment corresponding to a battery with a highest state of charge from the remaining battery compartments to perform power allocation.

Solution 21. A computer-readable storage medium, storing a plurality of program codes, where the program codes are adapted to be loaded and run by a processor to perform the power control method for the battery charging and swap station according to any one of solutions 1 to 10.

Solution 22. A control apparatus, including:

a processor; and a memory, where the memory is adapted to store a plurality of program codes, and the program codes are adapted to be loaded and executed by the processor to implement the power control method for the battery charging and swap station according to any one of solutions 1 to 10.

Solution 23. A battery charging and swap station, where the battery charging and swap station includes a battery swap station and a number of charging piles, and the battery swap station is provided with the control apparatus according to solution 22.

BRIEF DESCRIPTION OF THE SEVERAL VIEWS OF THE DRAWINGS

A power control method and system for a battery charging and swap station, a medium, and the battery charging and swap station in the disclosure will be described below with reference to the accompanying drawings. In the accompanying drawings.

LIST OF REFERENCE NUMERALS

1. Battery swap station; 11. First control unit; 12. Charging branch; 13. Data exchange apparatus; 2. Charging pile; 21. Second control unit; 3. Measurement and control electricity meter; and 5. Bus bar.

DETAILED DESCRIPTION

Preferred embodiments of the disclosure are described below with reference to the accompanying drawings. Those skilled in the art should understand that these embodiments are only used to explain the technical principles of the disclosure, and are not intended to limit the scope of protection of the disclosure. For example, although the embodiments are described in conjunction with a battery electric vehicle, it is not intended to limit the scope of protection of the disclosure. Without departing from the principles of the disclosure, those skilled in the art can apply the disclosure to other application scenarios. For example, the disclosure is also applicable to a new energy vehicle that needs to be charged, such as a hybrid vehicle.

It should be noted that, in the description of the disclosure, the terms "first" and "second" are merely used for description, but cannot be understood as indicating or implying the relative importance.

It should also be noted that, in the description of the disclosure, the terms "mount", "engage" and "connect" should be interpreted in a broad sense unless explicitly defined and limited otherwise, which, for example, may mean a fixed connection, a detachable connection or an integral connection; or may mean a mechanical connection or an electrical connection; or may mean a direct connection, an indirect connection by means of an intermediary, or internal communication between two elements. For those skilled in the art, the specific meaning of the above-mentioned terms in the disclosure can be interpreted according to the specific situation.

Figure 1:
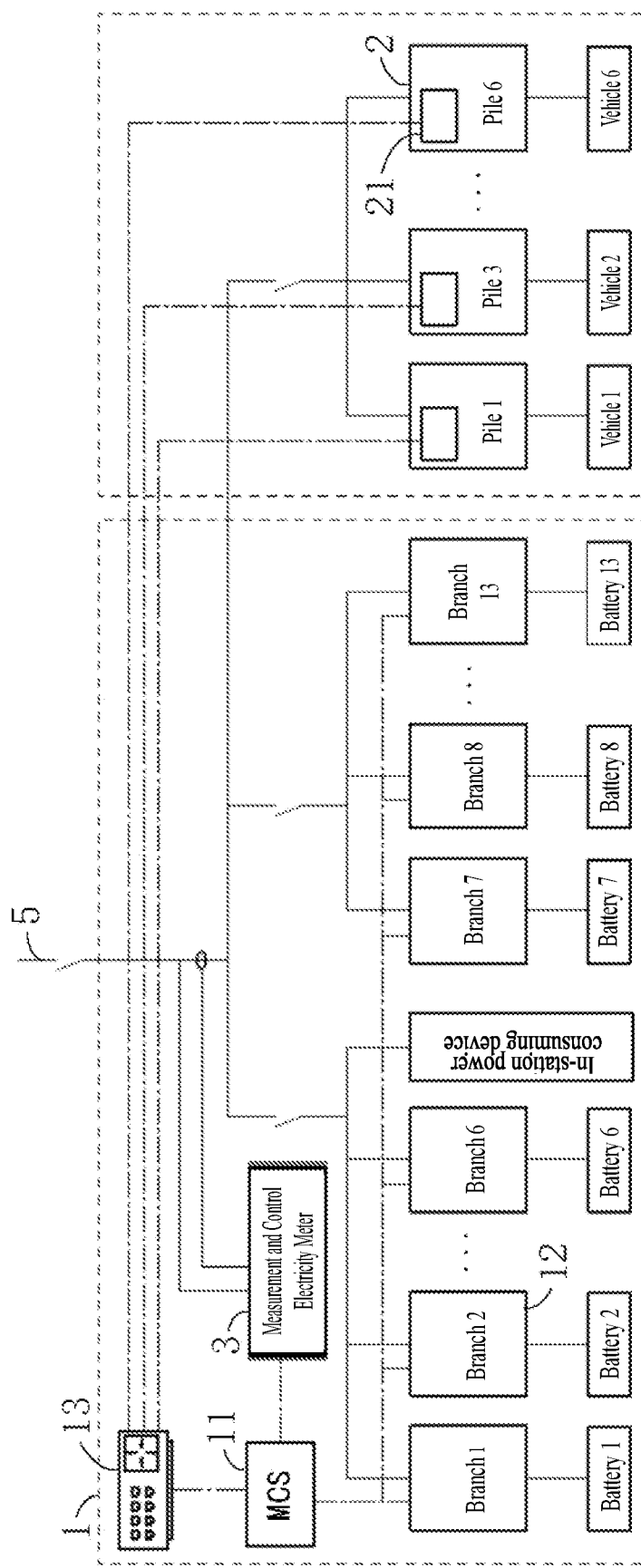
FIG. 1 is a system diagram of a battery charging and swap station according to the disclosure.

First, referring to FIG. 1, a brief description is made to a battery charging and swap station according to the disclosure. FIG. 1 is a system diagram of a battery charging and swap station according to the disclosure, where a solid line represents a circuit, and a dash dotted line represents a communication line.

As shown in FIG. 1, the battery charging and swap station in the disclosure includes a battery swap station 1 and charging piles 2. The battery swap station 1 includes a first control unit 11 and one or more battery compartments (not shown in the figure). Each battery compartment includes a charging branch 12, and when a traction battery is located in the battery compartment, the charging branch 12 engages with the traction battery and charges the traction battery. The first control unit 11 is arranged in the battery swap station 1, and each battery compartment is communicatively connected to the first control unit 11, so that the first control unit 11 sends a power allocation instruction to the battery compartment to control a charging power of the battery compartment. The charging pile 2 includes a charging gun (not shown in the figure) and a second control unit 21. The charging gun is capable of being in plug-in connection with a charging socket provided on a new energy vehicle, the charging gun is electrically connected to the second control unit 21, and the second control unit 21 is communicatively connected to the first control unit 11, so that the second control unit 21 can receive the power allocation instruction sent by the first control unit 11, and control the charging gun to charge the new energy vehicle based on the power allocation instruction.

The electricity of the battery charging and swap station 1 is introduced by one bus bar 5, and all of the battery compartments and charging piles 2 are connected to the bus bar 5. The battery swap station 1 is provided with a first control unit 11, in-station power consuming devices, and one or more battery compartments. The first control unit 11 preferably adopts a master control system (MCS for short) of the battery swap station 1, which is provided in a control cabinet of the battery swap station 1 and is mainly used for coordinating actions of all devices in the battery swap station 1 according to a preset control logic, such as coordinating a charging power and charging start-stop time when a battery is charged in the battery compartment, coordinating actions of each battery swapping mechanism when a traction battery is replaced for the electric vehicle to be swapped, interacting with a cloud server, controlling auxiliary devices such as a lighting apparatus and a cooling apparatus in the battery charging and swap station 1, and the like.

Generally, the performance of the master control system of the battery swap station 1 is much stronger than that of the second control unit 21 of the charging pile 2. By using the master control system of the battery swap station 1 as the first control unit 11, power allocation for the battery compartment and the charging pile 2 is completed, which can rapidly and stably respond to allocation strategies and ensure the stable operation of the battery charging and swap station 1.

It should be noted that, although a specific model of the master control system is not described in the disclosure, this does not mean that the master control system is not fully disclosed. Instead, the master control system is a control apparatus necessary for the battery swap station 1, and those skilled in the art know the specific type and configuration thereof, which will not be repeated in the disclosure again.

The in-station power consuming devices mainly refer to power consuming devices other than the battery compartment, including but not limited to devices in a battery swapping process (such as a battery swap trolley, a battery transfer device, a hoisting mechanism, a locking/unlocking mechanism, and a positioning mechanism), a lighting device, a communications device, and the like, and the powers of these devices are generally fixed during operation and need to be fixedly provided by the bus bar 5. In this embodiment, for example, 13 battery compartments are provided, where the 13 battery compartments are divided into two groups, the first six battery compartments together with other in-station power consuming devices are a first group, which are connected to the bus bar 5 through a same circuit breaker, and the last seven battery compartments are a second group, which are connected to the bus bar 5 through another circuit breaker. Each battery compartment includes one charging branch 12, and each charging branch 12 includes a charging control board, a charging AC/DC module, a direct current contactor, or the like. The charging control board is communicatively connected to the first control unit 11, and preferably, each charging control board is communicatively connected to the first control unit 11 through a CAN bus.

The charging pile 2 is a direct-current charging pile in the disclosure, and more specifically, is a super charging pile, which has the characteristics of a large charging power and a large charging current, and can provide fast, intelligent, and reliable charging services for the new energy vehicle. In this embodiment, 6 super charging piles are provided, and all the super charging piles are a group, which are connected to the bus bar 5 through a circuit breaker. Each super charging pile is provided with a second control unit 21, and the second control unit 21 is communicatively connected to the first control unit 11.

Still referring to FIG. 1, the battery swap station 1 is further provided with a data exchange apparatus 13, and the first control unit 11 and the second control unit 21 are communicatively connected to the data exchange apparatus 13 simultaneously, thereby implementing communication connection between the first control unit 11 and the second control unit 21. Specifically, the data exchange apparatus 13 is a switch, and the first control unit 11 and/or the second control unit 21 are/is communicatively connected to the data exchange apparatus 13 in a wired manner. In the disclosure, the first control unit 11 and the second control unit 21 are communicatively connected to the switch through an RJ45 communication line. When the battery charging and swap station 1 is operating, the first control unit 11 of the battery swap station 1 communicates with the second control unit 21 of the charging pile 2 through the switch, and a communication period may be set manually, such as setting to 2s-30s. In the disclosure, 5s is taken as an example, that is, the second control unit 21 of the charging pile 2 may send a charging requested power of the charging pile 2 to the switch every 5s, the switch transmits the charging requested power to the first control unit 11, and after the first control unit 11 determines a power allocation, a power allocation instruction is transmitted back to the second control unit 21 through the switch, so that the second control unit 21 controls a charging output power of the charging pile 2 based on the instruction.

The first control unit 11 and the second control unit 21 are communicatively connected to the switch in a wired manner, which ensures the stability of signal transmission. The switch is used to implement the communication connection between the first control unit 11 and the second control unit 21, which can improve the connection efficiency and guarantee the security of data transmission.

The battery charging and swap station 1 further includes a measurement and control electricity meter 3, and the measurement and control electricity meter 3 is communicatively connected to the first control unit 11 for measuring the whole station power of the battery charging and swap station 1. Specifically, the measurement and control electricity meter 3 is arranged on the bus bar 5, so that the whole station power of the battery charging and swap station 1 can be directly measured from the bus bar 5. Therefore, the first control unit 11 may directly obtain the whole station power of the battery charging and swap station 1, and arrange the powers of the charging devices based on the whole station power, so as to implement the monitoring of a real-time load power of the whole station, avoid the tripping and device damage caused by the station operating exceeding a power limit from the source of power supply, and reduce the operation and maintenance costs.

When the battery charging and swap station 1 is put into use, the first control unit 11 separately obtains a charging requested power of each rechargeable battery in the battery compartments and a charging requested power of each charging pile 2, determines a power allocated to each battery compartment and each charging pile 2 based on a current maximum available power of the station, a charging requested power of each battery compartment, and the charging requested power of each charging pile 2, and then sends a control instruction to each battery compartment and each charging pile 2 based on the allocation result, so that each battery compartment and each charging pile 2 may be operated based on respective allocated powers.

It should be noted that, although a specific configuration of the battery charging and swap station 1 is described in the above embodiments, but this is not intended to limit the scope of protection of the disclosure. Those skilled in the art may adjust the specific form of the above battery charging and swap station 1 without departing from the principles of the disclosure, so that the power control method described below in the disclosure may be applied to more application scenarios.

For example, although the above examples are described in conjunction with the data exchange apparatus 13 that is a switch, such a configuration is not unchanged, and those skilled in the art can adjust the configuration, as long as the adjusted technical solution can meet the communication connection between the first control unit 11 and the second control unit 21. For example, in other embodiments, a concentrator may alternatively be used to implement communication connection between the two, or the providing of a switch is omitted, so that the two are communicatively connected directly through a data line. In addition, the switch, and the first control unit 11 and the second control unit 21 may be connected in a wired manner, such as through a wired network (RJ45), an RS485/232, or a power line carrier (PLC), or may be connected in a wireless manner, such as through WIFI, Bluetooth, or ZIGBEE, or may be connected in a form of both the wired manner and the wireless manner.

For another example, in another alternative embodiment, although the above embodiment is described in conjunction with the first control unit 11 and the battery compartment being connected through the CAN bus, this communication connection manner is not unchanged, and those skilled in the art can adjust the communication connection manner based on specific application scenarios. For example, a 485 bus may alternatively be used to replace the above CAN bus.

For another example, in another alternative embodiment, the specific composition of the charging branch 12 of the battery compartment is described in the above embodiment in conjunction with the charging control board, the charging AC/DC module, and the direct current contactor that are included. However, this is not intended to limit the scope of protection of the disclosure, and those skilled in the art can replace the above charging branch 12 with any form of charging branch.

For another example, in another alternative embodiment, although a measurement and control electricity meter 3 is provided in the above battery charging and swap station 1, the measurement and control electricity meter 3 is not necessary in the disclosure, and those skilled in the art can decide its use or deletion based on specific application scenarios.

For another example, in another alternative embodiment, although the above first control unit 11 preferably adopts the master control system of the battery swap station 1, it is obvious that such a configuration is not unique. In other embodiments, those skilled in the art may provide a separate controller to complete the functions of the above first control unit 11.

For another example, in another alternative embodiment, although the above charging pile 2 is described as a super charging pile, the battery charging and swap station 1 in the disclosure is not limited to this. In other embodiments, the super charging pile may alternatively be replaced with a common direct-current charging pile, or may be replaced with an alternating current charging pile.

Of course, the above alternative embodiments, or the alternative embodiments and the preferable embodiments may be cross-used cooperatively, so as to obtain new embodiments that are suitable for more specific application scenarios by combining the above embodiments.

Figure 2:
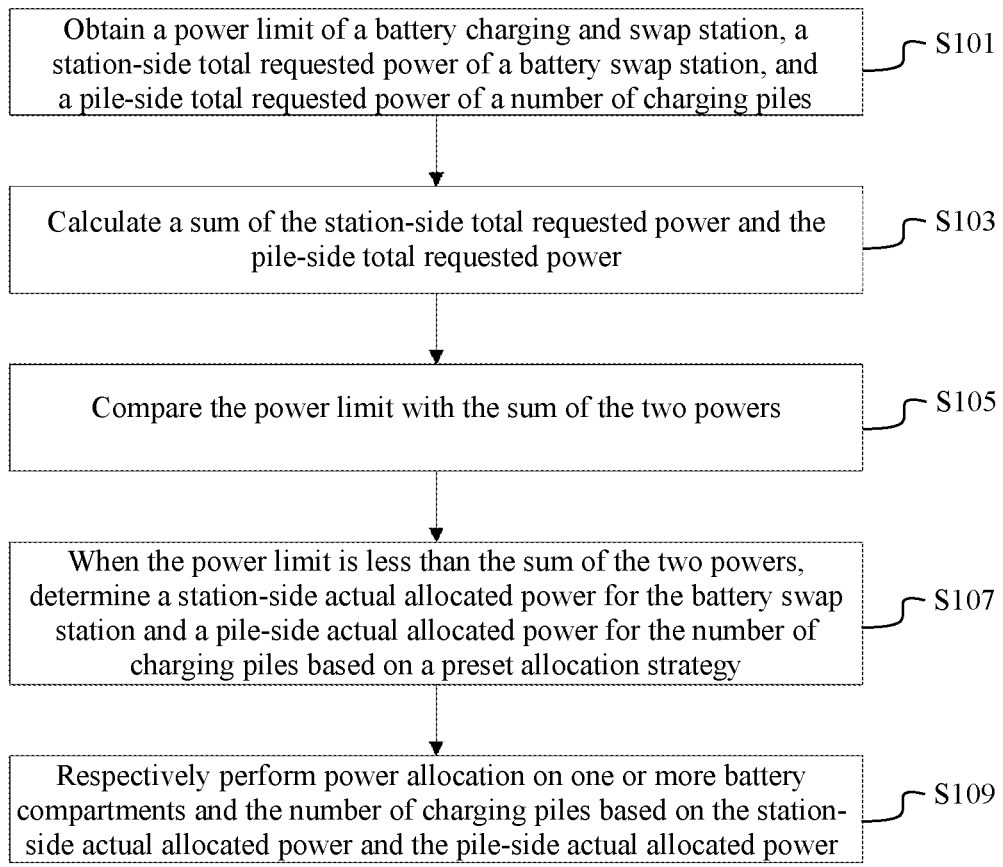
FIG. 2 is a flowchart of a power control method for a battery charging and swap station according to the disclosure.

The following describes, with reference to FIG. 2, a power control method for a battery charging and swap station according to the disclosure. FIG. 2 is a flowchart of a power control method for a battery charging and swap station according to the disclosure.

As shown in FIG. 2, to implement integrated power management of the battery charging and swap station, the power control method in the disclosure mainly includes the following steps:

S101. a power limit of the battery charging and swap station, a station-side total requested power of a battery swap station, and a pile-side total requested power of a number of charging piles are obtained. For example, the power limit may be an artificially set fixed value, or may be calculated or obtained in real time based on information from an upstream power grid. The specific obtaining methods are not limited in the disclosure, as long as the power limit can be obtained accurately. The station-side total requested power of the battery swap station includes charging requested powers (or referred to as compartment-side requested powers) of all battery compartments that need to perform charging and power consumption (or referred to as non-charging power consumption) of in-station power consuming devices. The sum of the two powers is the station-side total requested power. The pile-side total requested power of the charging pile includes requested powers (or referred to as pile-side requested powers) of all charging piles that need to perform external services. A first control unit obtains the compartment-side requested power of each battery compartment and the non-charging power consumption by communicating with the battery compartments and the in-station power consuming devices, and calculates the station-side total requested power by adding the two. The first control unit obtains the pile-side requested powers of the charging piles by communicating with a second control unit, and adds the powers up to obtain the pile-side total requested power.

S103. a sum of the station-side total requested power and the pile-side total requested power is calculated. For example, after obtaining the station-side total requested power and the pile-side total requested power, the first control unit calculates the sum of the two powers, that is, obtaining the total requested power for the battery charging and swap station.

S105. the power limit is compared with the sum of the two powers. For example, the two are compared by calculating a difference or ratio between the power limit and the total requested power for the battery charging and swap station.

S107. when the power limit is less than the sum of the two powers, a station-side actual allocated power for the battery swap station and a pile-side actual allocated power for the number of charging piles are determined based on a preset allocation strategy. For example, when the power limit is greater than or equal to the sum of the two powers, it is proved that the current power limit can meet the power request of each battery compartment and each charging pile. In this case, power allocation is performed based on the compartment-side requested power and the pile-side requested power. When the requested power is less than the sum of the two powers, it is proved that the power limit cannot meet the power request of at least one of the battery compartment and the charging pile, and further power allocation is required to avoid operating exceeding a power limit. In this case, the station-side actual allocated power for the battery swap station and the pile-side actual allocated power for the number of charging piles are determined based on the preset allocation strategy. The preset allocation strategy can be, for example, to give priority to the power allocation of all charging piles, or to give priority to the power allocation of all battery compartments, or to allocate a power to battery compartments and charging piles according to a preset allocation ratio. The following embodiment will describe a preferred allocation method.

S109. power allocation is respectively performed on one or more battery compartments and the number of charging piles based on the station-side actual allocated power and the pile-side actual allocated power. For example, after the station-side actual allocated power and the pile-side actual allocated power are determined, power allocation is performed on the battery compartments that need to perform charging based on the station-side actual allocated power, and power allocation is performed on the charging piles that need to provide services based on the pile-side actual allocated power.

It may be seen from the above description that, when the power limit is less than the sum of the station-side total requested power and the pile-side total requested power, by determining the station-side actual allocated power and the pile-side actual allocated power based on the preset allocation strategy, and then performing power allocation on the battery compartments and the charging piles based on the station-side actual allocated power and the pile-side actual allocated power, the disclosure solves the problem of integrated power management of the battery charging and swap station that integrates the battery swap station and the charging piles, implements flexible and efficient power allocation under a limited power, and ensures a service capability.

The following describes the preferable embodiments of the disclosure.

In a possible embodiment, the station-side total requested power of the battery swap station is determined in the following manner obtaining a number N of required batteries; selecting N batteries with a highest state of charge from the battery swap station; calculating a total charging requested power of the N batteries; calculating non-charging power consumption of an in-station power consuming device in the battery swap station; and calculating a sum of the total charging requested power and the non-charging power consumption as the station-side total requested power, where the number of required batteries is determined based on a reserved battery swap order of the battery swap station.

For example, the battery swap station is communicatively connected to a cloud server, such as communicatively connected to the cloud server through the first control unit. Users of electric vehicles can reserve a battery swap service of a specific battery swap station through an intelligent terminal (such as a vehicle head unit, a mobile phone, a computer, or a tablet computer). After the cloud server counts reserved battery swap orders of each battery swap station, that is, counting required batteries (assuming its number to be N), the cloud server sends the number N of required batteries at this moment to the battery swap station, and the battery swap station selects N batteries (including fully charged batteries) with a highest state of charge (SOC) based on the number N and sets the N batteries to a charging mode, that is, starting the batteries with a low power first, and then charging the batteries based on the required power of the batteries (the fully charged batteries do not need to start charging). Those skilled in the art know that when the batteries are located in different battery capacity ranges, the required powers thereof are different. In general, higher states of charge indicate lower required powers of the batteries. Subsequently, the total charging requested power of the N batteries is obtained by calculating and adding up the compartment-side requested powers of the battery compartments. Then, the non-charging power consumption is calculated based on a required power of the in-station power consuming device in the battery swap station. Finally, the sum of the total charging requested power and the non-charging power consumption is calculated as the station-side total requested power.

By determining the number N of required batteries based on the reserved battery swap order of the battery swap station, thereby determining the station-side total requested power, the disclosure can allocate powers as many as possible to the charging piles, on the premise that the service capability of the battery swap station is not affected, and effectively improve the utilization rate of the battery capacity of the station.

Certainly, in other embodiments, the station-side total requested power may alternatively be calculated based on the compartment-side requested power of all battery compartments that need to perform charging in the current battery swap station, but this allocation method will inevitably reduce the utilization rate of the battery capacity of the station.

In a possible embodiment, step S107 further includes: determining a station-side pre-allocated power for the battery swap station and a pile-side pre-allocated power for the number of charging piles; comparing the station-side pre-allocated power with the station-side total requested power and comparing the pile-side pre-allocated power with the pile-side total requested power; and determining, based on a comparison result, the station-side actual allocated power and the pile-side actual allocated power. Specifically, if the station-side pre-allocated power is greater than or equal to the station-side total requested power, it is determined that the station-side actual allocated power is the station-side total requested power and the pile-side actual allocated power is a difference between the power limit and the station-side total requested power; if the pile-side pre-allocated power is greater than or equal to the pile-side total requested power, it is determined that the pile-side actual allocated power is the pile-side total requested power and the station-side actual allocated power is a difference between the power limit and the pile-side total requested power; and if the station-side pre-allocated power is less than the station-side total requested power and the pile-side pre-allocated power is less than the pile-side total requested power, it is determined that the station-side actual allocated power is the station-side pre-allocated power and the pile-side actual allocated power is the pile-side pre-allocated power.

For example, in a more preferred embodiment, the station-side pre-allocated power and the pile-side pre-allocated power may be determined by using the method indicated by the following formulas:

$$Pscmd = N \times a + Pswap \quad (1)$$

$$Pccmd = PL - Pscmd \quad (2)$$

In Formula (1) and Formula (2), Pscmd is the station-side pre-allocated power; N is a number of required batteries; a is a power constant, and the power constant a can be comprehensively considered in combination with the actual operating conditions and the power limit of the charging branch of the battery compartment; Pswap is non-charging power consumption of an in-station power consuming device in the battery swap station; Pccmd is the pile-side pre-allocated power; and PL is the power limit.

In other words, when the power limit is not enough to make the battery compartment and the charging pile operate at their respective total requested powers, the station-side pre-allocated power and the pile-side pre-allocated power are first determined according to Formula (1) and Formula (2), and then based on the station-side pre-allocated power and the pile-side pre-allocated power, it is determined whether one of them can meet the station-side total requested power or the pile-side total requested power. If it can be met, the total requested power that can be met is taken as the actual allocated power for the side.

For example, PL=500 kW, N=5, a=30 kW, Pswap=20 kW, the station-side total requested power Psr1=150 kW, and the pile-side total requested power Pcr1=400 kW. The station-side pre-allocated power Pscmd=N×a+Pswap=5×30+20=170 kW and the pile-side pre-allocated power Pccmd=PL-Pscmd=500-170=330 kW can be calculated respectively according to Formula (1) and Formula (2). It can be learned that Pscmd>Psr1, and in this case, the station-side pre-allocated power can meet the station-side total requested power of the battery compartment. Then, it is assumed that the station-side actual allocated power is P'scmd=Psr1=150 kW, and the pile-side actual allocated power is P'ccmd=PL-Psr1=350 kW, which prioritizes the allocation of the total requested power of the battery compartment.

For another example, PL=500 kW, N=5, a=30 kW, Pswap=20 kW, the station-side total requested power Psr2=220 kW, and the pile-side total requested power Pcr2=300 kW. The station-side pre-allocated power Pscmd=170 kW and the pile-side pre-allocated power Pccmd=330 kW can be calculated respectively according to Formula (1) and Formula (2). It can be learned that Pscmd<Psr2 and Pccmd>Pcr2, and in this case, the pile-side pre-allocated power can meet the pile-side total requested power of the charging pile. Then, it is assumed that the pile-side actual allocated power is P'ccmd=Pcr2=300 kW, and the station-side actual allocated power is P'scmd=PL-Pcr2=200 kW, which prioritizes the allocation of the total requested power of the charging pile.

For still another example, PL=500 kW, N=5, a=30 kW, Pswap=20 kW, the station-side total requested power Psr3=220 kW, and the pile-side total requested power Pcr3=350 kW. The station-side pre-allocated power Pscmd=170 kW and the pile-side pre-allocated power Pccmd=330 kW can be calculated respectively according to Formula (1) and Formula (2). It can be learned that Pscmd<Psr3 and Pccmd<Pcr3, and in this case, the station-side pre-allocated power and the pile-side pre-allocated power cannot meet their respective station-side total requested power and pile-side total requested power. Then, it is assumed that the pile-side actual allocated power is P'scmd=Pscmd=170 kW, and the station-side actual allocated power is P'ccmd=Pccmd=330 kW, which ensures a balanced allocation of the total requested power of the battery compartment and the charging pile.

By first determining the station-side pre-allocated power and the pile-side pre-allocated power and further determining the station-side actual allocated power and the pile-side actual allocated power based on the station-side pre-allocated power and the pile-side pre-allocated power, the control method in the disclosure first performs the total power allocation between the battery swap station and the charging piles, and then performs power allocation among the battery compartments in the battery swap station and power allocation among the charging piles, which ensures the total allocation efficiency between the battery swap station and the charging pile at the same time and implements the balanced and efficient allocation of the limited power.

In a possible implementation, after the station-side actual allocated power and the pile-side actual allocated power are determined, step S109 is further described based on the above three allocation results.

i) When the station-side actual allocated power is the station-side total requested power and the pile-side actual allocated power is the difference between the power limit and the station-side total requested power, step S109 further includes: performing power allocation on each battery compartment based on its compartment-side requested power; performing, based on the pile-side actual allocated power, equal power allocation on each charging pile; determining whether there is redundancy in a pile-side actual power obtained by each charging pile; and if there is redundancy, secondarily allocating a redundant power of the charging pile that has a pile-side actual power with redundancy to the charging pile that has a pile-side actual power without redundancy.

For example, when the station-side actual allocated power is the station-side total requested power, each battery compartment that needs to perform charging can obtain a respective required power, and in this case, power allocation is performed on each battery compartment based on the compartment-side requested power of each battery compartment. However, when the pile-side actual allocated power is the difference between the power limit and the station-side total requested power, at least some charging piles cannot obtain respective required powers, and in this state, primary power allocation is first performed based on the pile-side actual allocated power, that is, the power is equally allocated to each charging pile; then after the allocation, whether there is redundancy in the pile-side actual power obtained by each charging pile is determined, for example, by comparing the pile-side requested power and the obtained average power (pile-side actual power) to determine whether there is power redundancy in the charging pile, and if there is redundancy, a redundant power will be secondarily allocated to a charging pile that has a pile-side actual power without redundancy.

In a possible embodiment, the redundant power on the station side can be allocated as follows:

Manner 1: all redundant powers are equally allocated to other charging piles without power redundancy, and if there is still power redundancy after the allocation is completed, equal allocation continues to be performed by using the above-mentioned method until there is no power redundancy in the charging pile.

Manner 2: allocation is performed based on the priority of the charging order, that is, the redundant power is preferentially allocated to the charging pile that firstly starts to provide charging services among the remaining charging piles, and if there is still power redundancy, allocation continues to be performed based on the above priority until there is no power redundancy in the charging pile.

ii) When the pile-side actual allocated power is the pile-side total requested power and the station-side actual allocated power is the difference between the power limit and the pile-side total requested power, step S109 further includes: performing power allocation on each charging pile based on its pile-side requested power; performing, based on the station-side actual allocated power, equal power allocation on each battery compartment; determining whether there is redundancy in a compartment-side actual power obtained by each battery compartment; and if there is redundancy, secondarily allocating a redundant power of the battery compartment that has a compartment-side actual power with redundancy to the battery compartment that has a compartment-side actual power without redundancy.

For example, when the pile-side actual allocated power is the pile-side total requested power, each charging pile that is providing charging services can obtain a respective required power, and in this case, power allocation is performed on each charging pile based on the pile-side requested power of each charging pile. However, when the station-side actual allocated power is the difference between the power limit and the pile-side total requested power, at least some battery compartments cannot obtain respective required powers, and in this state, primary power allocation is first performed based on the station-side actual allocated power, that is, the power is equally allocated to each battery compartment; then after the allocation, whether there is redundancy in the compartment-side actual power obtained by each battery compartment is determined, for example, by comparing the compartment-side requested power and the obtained average power (compartment-side actual power) to determine whether there is power redundancy in the battery compartment, and if there is redundancy, a redundant power will be secondarily allocated to a battery compartment that has a compartment-side actual power without redundancy.

In a possible embodiment, the redundant power on the compartment side can be allocated as follows:

Manner 1: all redundant powers are equally allocated to other battery compartments without power redundancy, and if there is still power redundancy after the allocation is completed, equal allocation continues to be performed by using the above-mentioned method until there is no power redundancy in the battery compartment.

Manner 2: allocation is performed based on the priority of the state of charge, that is, the redundant power is preferentially allocated to the battery compartment with a battery having a highest state of charge among the remaining battery compartments, and if there is still power redundancy, allocation continues to be performed based on the above priority until there is no power redundancy in the battery compartment.

Manner 3: allocation is performed based on the priority of a battery capacity, that is, the redundant power is preferentially allocated to the battery compartment with a highest battery capacity among the remaining battery compartments, and if there is still power redundancy, allocation continues to be performed based on the above priority until there is no power redundancy in the battery compartment.

iii) When the station-side actual allocated power is the station-side pre-allocated power and the pile-side actual allocated power is the pile-side pre-allocated power, step S109 further includes: performing, based on the station-side actual allocated power, equal power allocation on each battery compartment; determining whether there is redundancy in a compartment-side actual power obtained by each battery compartment; if there is redundancy, secondarily allocating a redundant power of the battery compartment that has a compartment-side actual power with redundancy to the battery compartment that has a compartment-side actual power without redundancy; performing, based on the pile-side actual allocated power, equal power allocation on each charging pile; determining whether there is redundancy in a pile-side actual power obtained by each charging pile; and if there is redundancy, secondarily allocating a redundant power of the charging pile that has a pile-side actual power with redundancy to the charging pile that has a pile-side actual power without redundancy.

For example, when the station-side actual allocated power is the station-side pre-allocated power and the pile-side actual allocated power is the pile-side pre-allocated power, there are devices in both the battery compartments and the charging piles that cannot obtain their respective required powers, and in this state, primary power allocation and secondary power allocation are performed on the battery compartments based on the station-side actual allocated power, and primary power allocation and secondary power allocation are performed on the charging piles based on the pile-side actual allocated power. The primary allocation and secondary allocation on the station side and the primary allocation and secondary allocation on the pile side are the same as the above-mentioned methods, which are not repeated herein again.

When the station-side/pile-side actual allocated power is less than the station-side/pile-side total requested power, the primary and secondary power allocation to the battery compartment/charging pile can make as many devices as possible be operated at the requested power, and make the limited battery capacity used more efficiently.

Certainly, either for the primary allocation to the battery compartment or the charging pile, the above-mentioned equal allocation is only a preferred embodiment. In addition, those skilled in the art can also use other allocation methods to perform power allocation, and the change of this specific allocation method does not deviate from the principles of the disclosure. For example, the primary allocation may alternatively be performed based on the ratio of the compartment-side/pile-side requested power to the station-side/pile-side total requested power.

In a possible embodiment, the power control method further includes: obtaining a real-time total power of the battery charging and swap station; comparing the real-time total power with the power limit; and when the real-time total power is greater than the power limit, controlling a total power of the battery charging and swap station to be reduced to the power limit Specifically, on the premise that the battery swap station is provided with the above measurement and control electricity meter, the real-time total power of the battery charging and swap station is obtained through the measurement and control electricity meter. Then, the real-time total power is compared with the power limit, and if the real-time total power is greater than the power limit, it is proved that the current total power of the battery charging and swap station exceeds the power limit, which is easy to cause over-limit tripping and device failure. In this case, a difference between the real-time total power and the power limit is calculated, and the total power of the battery charging and swap station is controlled to reduce the difference, so as to reduce to the power limit, and avoid the above situation. Reducing the total power can be implemented in the following manners:

Manner 1: after the difference between the real-time total power and the power limit is calculated, a charging pile/battery compartment with a pile-side/compartment-side actual power greater than the difference is determined from the charging piles/battery compartments, and then the difference is reduced based on the power of the charging pile/battery compartment.

Manner 2: after the difference between the real-time total power and the power limit is calculated, the difference is equally allocated to all charging devices (charging piles and battery compartments), and then the power of all of the charging devices is controlled to be reduced.

Certainly, after the charging pile/battery compartment reduces the power, which will not last for a long time, when the first control unit interacts with the second control unit next time, power allocation can be performed again.

During power allocation, by performing real time monitoring on the real-time total power of the battery charging and swap station, and controlling the power allocation of the battery charging and swap station based on the real-time total power and the power limit, the disclosure can further perform power allocation strictly under the power limit, so as to avoid operation exceeding the power limit from the source, avoid the occurrence of tripping and device damage caused by the over-limited total power of the battery charging and swap station when the charging piles, the battery compartments, and other devices are anomalous, and reduce the operation and maintenance costs of the whole station.

Certainly, when the measurement and control electricity meter is not provided, the in-station real-time total power can also be calculated by obtaining the current real-time power of all battery compartments, in-station power consuming devices, and charging piles.

In a possible embodiment, the power control method further includes: obtaining a communication status of the charging pile; and if there is a charging pile in a disconnected state, allocating a preset power to the charging pile; and/or obtaining a communication status of the battery compartment; and if there is a battery compartment in a disconnected state, deactivating the battery compartment and selecting a battery compartment corresponding to a battery with a highest state of charge from the remaining battery compartments to perform power allocation.

For example, during power allocation, it is inevitable that there will be charging piles on which power allocation cannot be performed due to communication failures. In this case, when it is detected that the communication of a charging pile is disconnected, the preset power may be allocated to the charging pile, to avoid impact of its uncertainty on an overall power allocation strategy. Certainly, after the preset power is allocated to the charging pile, in the next power allocation, the preset power needs to be subtracted from the power limit.

Similarly, when there is a battery compartment in a disconnected state, a preset power can also be allocated to the battery compartment in this manner. In addition, when there are idle battery compartments, the battery compartment in the disconnected state can also be deactivated, and a battery compartment with a battery having a highest state of charge can be selected from the idle battery compartments to perform power allocation.

The above control method can ensure the stability of power allocation, avoid tripping and device damage caused by special circumstances, and strictly limit the real-time total power of the battery charging and swap station to be lower than the power limit.

Figure 3:
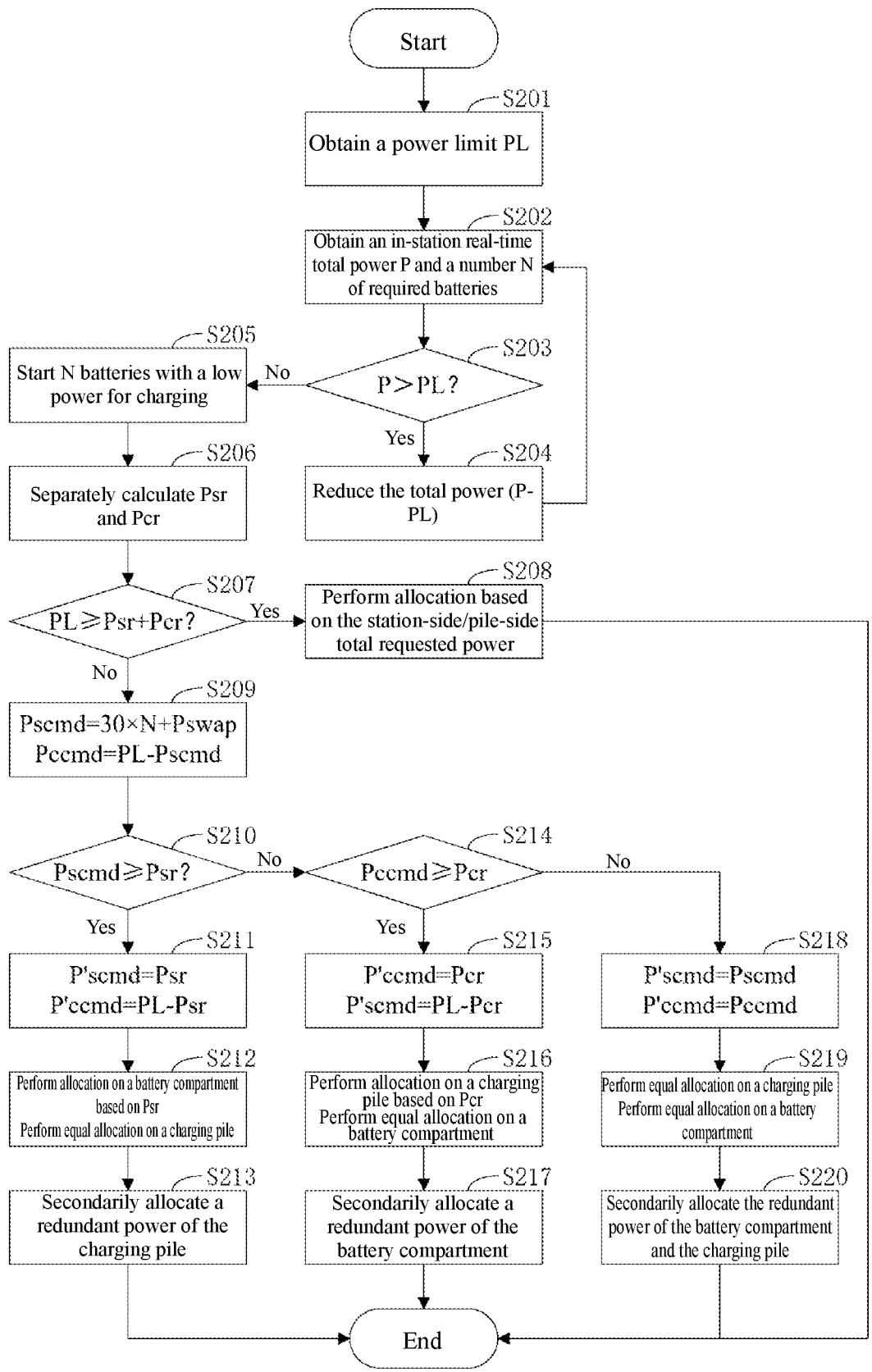
FIG. 3 is a logical diagram of a possible embodiment of a power control method for a battery charging and swap station according to the disclosure.

A possible control process in the disclosure will be described below with reference to FIG. 3. FIG. 3 is a logic diagram of a possible embodiment of a power control method for a battery charging and swap station according to the disclosure.

First, step S201 is performed to obtain a power limit PL, and then step S202 is performed.

S202. a real-time total power P of the battery charging and swap station is obtained, a number N of required batteries is received from a cloud, and then step S203 is performed.

S203. whether P>PL is met is determined. If it is met, step S204 is performed; and if it is not met, step S205 is performed.

S204. P−PL is calculated, the power of the charging pile with a highest pile-side actual power is controlled to be reduced (P−PL), and then the method returns to step S202.

S205. N batteries with a highest state of charge are started with a low power for charging.

S206. a station-side total requested power Psr of the battery swap station and a pile-side total requested power Pcr are calculated. The station-side total requested power Psr is determined by a sum of a total charging requested power of the N batteries and non-charging power consumption of in-station power consuming devices, and the pile-side total requested power Pcr is determined by the sum of the pile-side requested powers of the charging piles that are providing charging services.

S207. whether PL>Psr+Pcr is met is determined. If it is met, step S208 is performed; and if it is not met, step S209 is performed.

S208. power allocation is performed on each battery compartment based on the station-side total requested power and power allocation is performed on each charging pile based on the pile-side total requested power.

S209. it is determined that a station-side pre-allocated power is Pscmd=30×N+Pswap and a pile-side pre-allocated power is Pccmd=PL−Pscmd, and then step S210 is performed.

S210. whether Pscmd>Psr is met is determined. If it is met, steps S211 to S213 are performed once; and if it is not met, step S214 is further performed.

S211. it is determined that a station-side actual allocated power is P'scmd=Psr and a pile-side actual allocated power is P'ccmd=PL−Psr.

S212. power allocation is performed on each battery compartment based on a respective compartment-side requested power and equal power allocation is performed on a charging pile based on the pile-side actual allocated power P'ccmd.

S213. a redundant power of the charging pile is secondarily allocated.

S214. whether Pccmd>Pcr is met is determined. If it is met, steps S215 to S217 are performed once; and if it is not met, step S218-S220 is performed.

S215. it is determined that a pile-side actual allocated power is P'ccmd=Pcr and a station-side actual allocated power is P'scmd=PL−Pcr.

S216. power allocation is performed on each charging pile based on a respective pile-side requested power and equal power allocation is performed on a battery compartment based on the station-side actual allocated power P'scmd.

S217. a redundant power of the battery compartment is secondarily allocated.

S218. it is determined that a pile-side actual allocated power is P'ccmd=Pccmd and a station-side actual allocated power is P'scmd=Pscmd.

S219. equal power allocation is performed on a battery compartment based on the station-side actual allocated power P'scmd and equal power allocation is performed on a charging pile based on the pile-side actual allocated power P'ccmd.

S220. a redundant power of the battery compartment is secondarily allocated and a redundant power of the charging pile is secondarily allocated.

Although the steps are described in the above order in this embodiment, those skilled in the art can understand that in order to achieve the effects of this embodiment, different steps are not necessarily performed in this order, but can be performed simultaneously (in parallel) or in a reverse order, and these simple variations are within the scope of protection of the disclosure. For example, steps S201 and S202 may be performed simultaneously, or may be performed in a reverse order.

Figure 4:
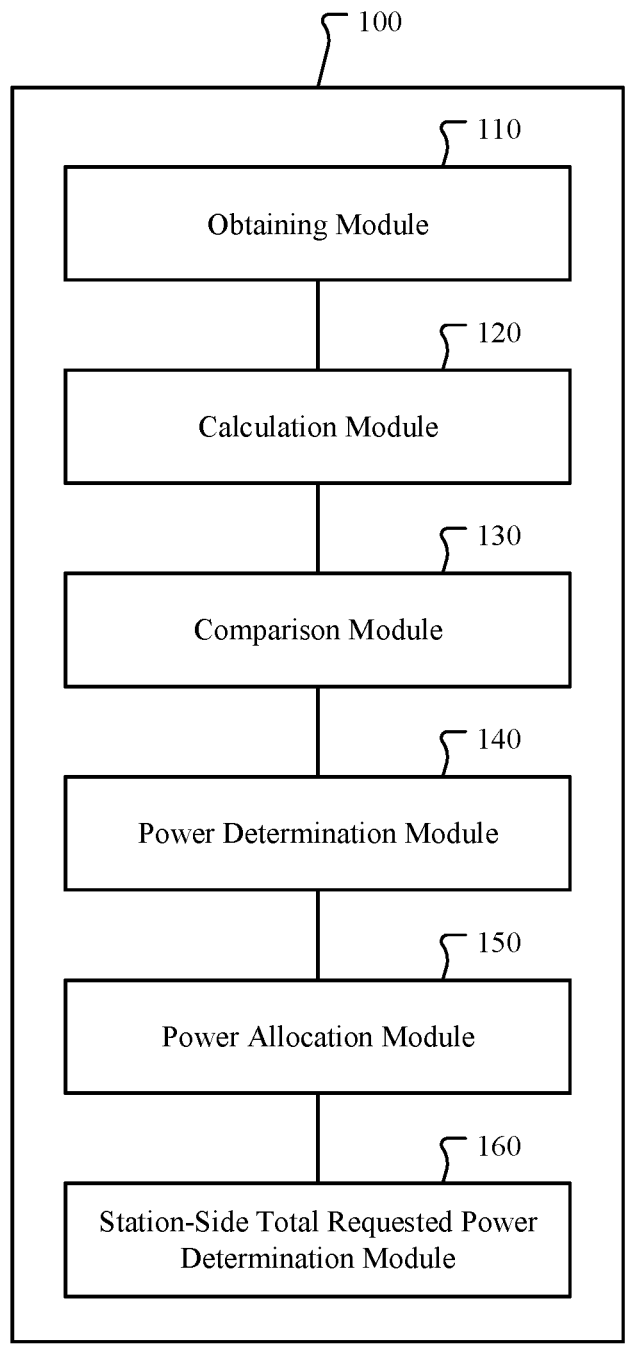
FIG. 4 is a system diagram of a power control system for a battery charging and swap station according to the disclosure.

The following briefly describes, with reference to FIG. 4, a power control system for a battery charging and swap station according to the disclosure. FIG. 4 is a system diagram of a power control system for a battery charging and swap station according to the disclosure.

As shown in FIG. 4, the power control system 100 for the battery charging and swap station according to the disclosure includes an obtaining module 110, a calculation module 120, a comparison module 130, a power determination module 140, and a power allocation module 150. The obtaining module 110 is configured to obtain a power limit of the battery charging and swap station, a station-side total requested power of the battery swap station, and a pile-side total requested power of the number of charging piles; the calculation module 120 is configured to calculate a sum of the station-side total requested power and the pile-side total requested power; the comparison module 130 is configured to compare the power limit with the sum of the two powers; the power determination module 140 is configured to determine, when the power limit is less than the sum of the two powers, based on a preset allocation strategy, a station-side actual allocated power for the battery swap station and a pile-side actual allocated power for the number of charging piles; and the power allocation module 150 is configured to respectively perform, based on the station-side actual allocated power and the pile-side actual allocated power, power allocation on one or more battery compartments and the number of charging piles. In an embodiment, for detailed description of function implementation, reference may be made to the description of steps S101 to S109.

In an embodiment, the power determination module 140 is further configured to determine, based on the preset allocation strategy, the station-side actual allocated power for the battery swap station and the pile-side actual allocated power for the number of charging piles in the following manner: determining a station-side pre-allocated power for the battery swap station and a pile-side pre-allocated power for the number of charging piles; comparing the station-side pre-allocated power with the station-side total requested power and comparing the pile-side pre-allocated power with the pile-side total requested power; and determining, based on a comparison result, the station-side actual allocated power and the pile-side actual allocated power. For detailed description of function implementation, reference may be made to the description of the above method steps.

In an embodiment, the power determination module 140 is further configured to determine, based on the comparison result, the station-side actual allocated power and the pile-side actual allocated power in the following manner if the station-side pre-allocated power is greater than or equal to the station-side total requested power, determining that the station-side actual allocated power is the station-side total requested power and the pile-side actual allocated power is a difference between the power limit and the station-side total requested power; if the pile-side pre-allocated power is greater than or equal to the pile-side total requested power, determining that the pile-side actual allocated power is the pile-side total requested power and the station-side actual allocated power is a difference between the power limit and the pile-side total requested power; and if the station-side pre-allocated power is less than the station-side total requested power and the pile-side pre-allocated power is less than the pile-side total requested power, determining that the station-side actual allocated power is the station-side pre-allocated power and the pile-side actual allocated power is the pile-side pre-allocated power. For detailed description of function implementation, reference may be made to the description of the above method steps.

In an embodiment, the power determination module 140 is further configured to determine the station-side pre-allocated power and the pile-side pre-allocated power by using the method indicated by the following formulas: Pscmd=N×a+Pswap, and Pccmd=PL-Pscmd. Pscmd is the station-side pre-allocated power; N is a number of required batteries; a is a power constant; Pswap is non-charging power consumption of an in-station power consuming device in the battery swap station; Pccmd is the pile-side pre-allocated power; and PL is the power limit. For detailed description of function implementation, reference may be made to the description of the above method steps.

In an embodiment, when the station-side actual allocated power is the station-side total requested power and the pile-side actual allocated power is the difference between the power limit and the station-side total requested power, the power allocation module 150 is further configured to respectively perform, based on the station-side actual allocated power and the pile-side actual allocated power, power allocation on the one or more battery compartments and the number of charging piles in the following manner: performing power allocation on each battery compartment based on its compartment-side requested power; performing, based on the pile-side actual allocated power, equal power allocation on each charging pile; determining whether there is redundancy in a pile-side actual power obtained by each charging pile; and if there is redundancy, secondarily allocating a redundant power of the charging pile that has a pile-side actual power with redundancy to the charging pile that has a pile-side actual power without redundancy. For detailed description of function implementation, reference may be made to the description of the above method steps.

In an embodiment, when the pile-side actual allocated power is the pile-side total requested power and the station-side actual allocated power is the difference between the power limit and the pile-side total requested power, the power allocation module 150 is further configured to respectively perform, based on the station-side actual allocated power and the pile-side actual allocated power, power allocation on the one or more battery compartments and the number of charging piles in the following manner: performing power allocation on each charging pile based on its pile-side requested power; performing, based on the station-side actual allocated power, equal power allocation on each battery compartment; determining whether there is redundancy in a compartment-side actual power obtained by each battery compartment; and if there is redundancy, secondarily allocating a redundant power of the battery compartment that has a compartment-side actual power with redundancy to the battery compartment that has a compartment-side actual power without redundancy.

In an embodiment, when the station-side actual allocated power is the station-side pre-allocated power and the pile-side actual allocated power is the pile-side pre-allocated power, the power allocation module 150 is further configured to respectively perform, based on the station-side actual allocated power and the pile-side actual allocated power, power allocation on the one or more battery compartments and the number of charging piles in the following manner performing, based on the station-side actual allocated power, equal power allocation on each battery compartment; determining whether there is redundancy in a compartment-side actual power obtained by each battery compartment; if there is redundancy, secondarily allocating a redundant power of the battery compartment that has a compartment-side actual power with redundancy to the battery compartment that has a compartment-side actual power without redundancy; performing, based on the pile-side actual allocated power, equal power allocation on each charging pile; determining whether there is redundancy in a pile-side actual power obtained by each charging pile; and if there is redundancy, secondarily allocating a redundant power of the charging pile that has a pile-side actual power with redundancy to the charging pile that has a pile-side actual power without redundancy. For detailed description of function implementation, reference may be made to the description of the above method steps.

In an embodiment, the power control system 100 further includes a station-side total requested power determination module 160 configured to determine the station-side total requested power of the battery swap station in the following manner: obtaining a number N of required batteries; selecting N batteries with a highest state of charge from the battery swap station; calculating a total charging requested power of the N batteries; calculating non-charging power consumption of an in-station power consuming device in the battery swap station; and calculating a sum of the total charging requested power and the non-charging power consumption as the station-side total requested power, where the number of required batteries is determined based on a reserved battery swap order of the battery swap station. For detailed description of function implementation, reference may be made to the description of the above method steps.

In an embodiment, the obtaining module 110 is further configured to obtain a real-time total power of the battery charging and swap station; the comparison module 130 is further configured to compare the real-time total power with the power limit; and the power allocation module 150 is further configured to, when the real-time total power is greater than the power limit, control a total power of the battery charging and swap station to be reduced to the power limit. For detailed description of function implementation, reference may be made to the description of the above method steps.

In an embodiment, the obtaining module 110 is further configured to obtain a communication status of the charging pile; and the power allocation module 150 is further configured to allocate, if there is a charging pile in a disconnected state, a preset power to the charging pile; and/or the obtaining module 110 is further configured to obtain a communication status of the battery compartment; and the power allocation module 150 is further configured to, if there is a battery compartment in a disconnected state, deactivate the battery compartment and select a battery compartment corresponding to a battery with a highest state of charge from the remaining battery compartments to perform power allocation. For detailed description of function implementation, reference may be made to the description of the above method steps.

It should be noted that the power control system 100 provided in the above embodiments is only illustrated by the division of the above functional modules (such as the obtaining module 110, the calculation module 120, the comparison module 130, the power determination module 140, the power allocation module 150, and the station-side total requested power determination module 160). In practical applications, the above functional modules can be implemented by different functional units according to requirements, that is, the functional modules in the embodiments are further split or combined, for example, the functional modules in the above embodiments may be combined into one functional module, or further split into a plurality of sub-modules to complete all or some of the functions described above. The names of the functional modules involved in the embodiments are merely for distinguishing purpose and are not to be construed as limiting the disclosure.

Those skilled in the art can understand that all or some of the procedures in the method of the above embodiments of the disclosure may also be implemented by a computer program instructing relevant hardware. The computer program may be stored in a computer-readable storage medium, and when the computer program is executed by a processor, the steps of the above method embodiments can be implemented. The computer program includes computer program code, which may be in a source code form, an object code form, an executable file form, some intermediate forms, or the like. The computer-readable storage medium may include: any entity or apparatus that can carry the computer program code, such as a medium, a USB flash drive, a removable hard disk, a magnetic disk, an optical disc, a computer memory, a read-only memory, a random access memory, an electrical carrier signal, a telecommunications signal, and a software distribution medium. It should be noted that the content included in the computer-readable storage medium can be appropriately added or deleted depending on requirements of the legislation and patent practice in a jurisdiction. For example, in some jurisdictions, according to the legislation and patent practice, the computer-readable storage medium does not include an electrical carrier signal and a telecommunications signal.

Various embodiments regarding components in the disclosure may be implemented in hardware, or implemented by software modules running on one or more processors, or implemented in combinations thereof. Those skilled in the art should understand that a microprocessor or a digital signal processor (DSP) may be used in practice to implement some or all of the functions of some or all of the components in the server and client according to the embodiments of the disclosure. The disclosure may alternatively be implemented as devices or device programs (for example, PC programs and PC program products) for performing some or all of the methods as described herein. Such programs for implementing the disclosure may be stored on a PC readable medium, or may be in the form of one or more signals. Such signals may be obtained by downloading from an Internet website, or provided on a carrier signal, or provided in any other form.

The disclosure further provides a computer-readable storage medium. In an embodiment of the computer-readable storage medium according to the disclosure, the computer-readable storage medium may be configured to store a program for performing the power control method for the battery charging and swap station in the above method embodiment, and the program may be loaded and run by a processor to implement the above the power control method for the battery charging and swap station. For ease of description, only parts related to the embodiments of the disclosure are shown. For specific technical details that are not disclosed, reference may be made to the method part of the embodiments of the disclosure. The computer-readable storage medium may be a storage apparatus device formed by various electronic devices. Optionally, the computer-readable storage medium in this embodiment of the disclosure is a non-transitory computer-readable storage medium.

The disclosure further provides a control apparatus. In an embodiment of the control apparatus according to the disclosure, the control apparatus includes a processor and a memory. The memory may be configured to store a program for performing the power control method for the battery charging and swap station in the above method embodiment, and the processor may be configured to execute the program in the memory. The program includes, but is not limited to, the program for performing the power control method for the battery charging and swap station in the above method embodiment. For ease of description, only parts related to the embodiments of the disclosure are shown. For specific technical details that are not disclosed, reference may be made to the method part of the embodiments of the disclosure. The control apparatus may be an apparatus device formed by various electronic devices.

The disclosure further provides a battery charging and swap station, the battery charging and swap station includes a battery swap station and a number of charging piles, and the battery swap station is provided with the above control apparatus.

Heretofore, the technical solutions of the disclosure have been described with reference to the preferred embodiments shown in the accompanying drawings. However, those skilled in the art can readily understand that the scope of protection of the disclosure is apparently not limited to these specific embodiments. Those skilled in the art can make equivalent changes or substitutions to the related technical features without departing from the principle of the disclosure, and all the technical solutions with such changes or substitutions shall fall within the scope of protection of the disclosure.

What is claimed is:

1. A power control method for a battery charging and swap station, wherein the battery charging and swap station comprises a battery swap station and a number of charging piles, the battery swap station is provided with one or more battery compartments, the battery compartment is configured to charge a traction battery, the charging pile comprises a charging gun, and the charging gun is capable of being in plug-in connection with a charging socket provided on a new energy vehicle, so as to charge the new energy vehicle; and the power control method comprises:
obtaining a power limit of the battery charging and swap station, a station-side total requested power of the battery swap station, and a pile-side total requested power of the number of charging piles;

calculating a sum of the station-side total requested power and the pile-side total requested power;

comparing the power limit with the sum of the two powers;

when the power limit is less than the sum of the two powers, determining, based on a preset allocation strategy, a station-side actual allocated power for the battery swap station and a pile-side actual allocated power for the number of charging piles; and respectively performing, based on the station-side actual allocated power and the pile-side actual allocated power, power allocation on the one or more battery compartments and the number of charging piles;

wherein the step of "determining, based on a preset allocation strategy, a station-side actual allocated power for the battery swap station and a pile-side actual allocated power for the number of charging piles" further comprises:

determining a station-side pre-allocated power for the battery swap station and a pile-side pre-allocated power for the number of charging piles;

comparing the station-side pre-allocated power with the station-side total requested power and comparing the pile-side pre-allocated power with the pile-side total requested power; and determining, based on a comparison result, the station-side actual allocated power and the pile-side actual allocated power.

2. The power control method for the battery charging and swap station according to claim 1, wherein the step of "determining, based on a comparison result, the station-side actual allocated power and the pile-side actual allocated power" further comprises:

if the station-side pre-allocated power is greater than or equal to the station-side total requested power, determining that the station-side actual allocated power is the station-side total requested power and the pile-side actual allocated power is a difference between the power limit and the station-side total requested power;

if the pile-side pre-allocated power is greater than or equal to the pile-side total requested power, determining that the pile-side actual allocated power is the pile-side total requested power and the station-side actual allocated power is a difference between the power limit and the pile-side total requested power; and if the station-side pre-allocated power is less than the station-side total requested power and the pile-side pre-allocated power is less than the pile-side total requested power, determining that the station-side actual allocated power is the station-side pre-allocated power and the pile-side actual allocated power is the pile-side pre-allocated power.

3. The power control method for the battery charging and swap station according to claim 1, wherein the station-side pre-allocated power and the pile-side pre-allocated power are determined by using the method indicated by the following formulas:

$$Pscmd = N \times a + Pswap,\text{ and}$$

$$Pccmd = PL - Pscmd,$$

wherein Pscmd is the station-side pre-allocated power; N is a number of required batteries; a is a power constant; Pswap is non-charging power consumption of an in-station power consuming device in the battery swap station; Pccmd is the pile-side pre-allocated power; and PL is the power limit.

4. The power control method for the battery charging and swap station according to claim 2, wherein when the station-side actual allocated power is the station-side total requested power and the pile-side actual allocated power is the difference between the power limit and the station-side total requested power, the step of "respectively performing, based on the station-side actual allocated power and the pile-side actual allocated power, power allocation on the one or more battery compartments and the number of charging piles" further comprises:

performing power allocation on each battery compartment based on its compartment-side requested power;

performing, based on the pile-side actual allocated power, equal power allocation on each charging pile;

determining whether there is redundancy in a pile-side actual power obtained by each charging pile; and if there is redundancy, secondarily allocating a redundant power of the charging pile that has a pile-side actual power with redundancy to the charging pile that has a pile-side actual power without redundancy.

5. The power control method for the battery charging and swap station according to claim 2, wherein when the pile-side actual allocated power is the pile-side total requested power and the station-side actual allocated power is the difference between the power limit and the pile-side total requested power, the step of "respectively performing, based on the station-side actual allocated power and the pile-side actual allocated power, power allocation on the one or more battery compartments and the number of charging piles" further comprises:

performing power allocation on each charging pile based on its pile-side requested power;

performing, based on the station-side actual allocated power, equal power allocation on each battery compartment;

determining whether there is redundancy in a compartment-side actual power obtained by each battery compartment; and if there is redundancy, secondarily allocating a redundant power of the battery compartment that has a compartment-side actual power with redundancy to the battery compartment that has a compartment-side actual power without redundancy.

6. The power control method for the battery charging and swap station according to claim 2, wherein when the station-side actual allocated power is the station-side pre-allocated power and the pile-side actual allocated power is the pile-side pre-allocated power, the step of "respectively performing, based on the station-side actual allocated power and the pile-side actual allocated power, power allocation on the one or more battery compartments and the number of charging piles" further comprises:

performing, based on the station-side actual allocated power, equal power allocation on each battery compartment;

determining whether there is redundancy in a compartment-side actual power obtained by each battery compartment;

if there is redundancy, secondarily allocating a redundant power of the battery compartment that has a compartment-side actual power with redundancy to the battery compartment that has a compartment-side actual power without redundancy;

performing, based on the pile-side actual allocated power, equal power allocation on each charging pile;

determining whether there is redundancy in a pile-side actual power obtained by each charging pile; and if there is redundancy, secondarily allocating a redundant power of the charging pile that has a pile-side actual power with redundancy to the charging pile that has a pile-side actual power without redundancy.

7. The power control method for the battery charging and swap station according to claim 1, wherein the station-side total requested power of the battery swap station is determined in the following manner:
obtaining a number N of required batteries;
selecting N batteries with a highest state of charge from the battery swap station;
calculating a total charging requested power of the N batteries;
calculating non-charging power consumption of an in-station power consuming device in the battery swap station; and
calculating a sum of the total charging requested power and the non-charging power consumption as the station-side total requested power,
wherein the number of required batteries is determined based on a reserved battery swap order of the battery swap station.

8. The power control method for the battery charging and swap station according to claim 1, wherein the power control method further comprises:
obtaining a real-time total power of the battery charging and swap station;
comparing the real-time total power with the power limit; and
when the real-time total power is greater than the power limit, controlling a total power of the battery charging and swap station to be reduced to the power limit.

9. The power control method for the battery charging and swap station according to claim 1, wherein the power control method further comprises:
obtaining a communication status of the charging pile; and if there is a charging pile in a disconnected state, allocating a preset power to the charging pile; and/or
obtaining a communication status of the battery compartment; and if there is a battery compartment in a disconnected state, deactivating the battery compartment and selecting a battery compartment corresponding to a battery with a highest state of charge from the remaining battery compartments to perform power allocation.

10. A power control system for a battery charging and swap station, where the battery charging and swap station includes a battery swap station and a number of charging piles, the battery swap station is provided with one or more battery compartments, the battery compartment is configured to charge a traction battery, the charging pile includes a charging gun, and the charging gun is capable of being in plug-in connection with a charging socket provided on a new energy vehicle, so as to charge the new energy vehicle; and the power control system includes:
an obtaining module configured to obtain a power limit of the battery charging and swap station, a station-side total requested power of the battery swap station, and a pile-side total requested power of the number of charging piles;
a calculation module configured to calculate a sum of the station-side total requested power and the pile-side total requested power;
a comparison module configured to compare the power limit with the sum of the two powers;
a power determination module configured to determine, when the power limit is less than the sum of the two powers, based on a preset allocation strategy, a station-side actual allocated power for the battery swap station and a pile-side actual allocated power for the number of charging piles; and
a power allocation module configured to respectively perform, based on the station-side actual allocated power and the pile-side actual allocated power, power allocation on the one or more battery compartments and the number of charging piles;
where the power determination module is further configured to determine, based on the preset allocation strategy, the station-side actual allocated power for the battery swap station and the pile-side actual allocated power for the number of charging piles in the following manner:
determining a station-side pre-allocated power for the battery swap station and a pile-side pre-allocated power for the number of charging piles;
comparing the station-side pre-allocated power with the station-side total requested power and comparing the pile-side pre-allocated power with the pile-side total requested power; and
determining, based on a comparison result, the station-side actual allocated power and the pile-side actual allocated power.

11. The power control system for the battery charging and swap station according to claim 10, where the power determination module is further configured to determine, based on the comparison result, the station-side actual allocated power and the pile-side actual allocated power in the following manner:
if the station-side pre-allocated power is greater than or equal to the station-side total requested power, determining that the station-side actual allocated power is the station-side total requested power and the pile-side actual allocated power is a difference between the power limit and the station-side total requested power;
if the pile-side pre-allocated power is greater than or equal to the pile-side total requested power, determining that the pile-side actual allocated power is the pile-side total requested power and the station-side actual allocated power is a difference between the power limit and the pile-side total requested power; and
if the station-side pre-allocated power is less than the station-side total requested power and the pile-side pre-allocated power is less than the pile-side total requested power, determining that the station-side actual allocated power is the station-side pre-allocated power and the pile-side actual allocated power is the pile-side pre-allocated power.

12. The power control system for the battery charging and swap station according to claim 10, where the power determination module is further configured to determine the station-side pre-allocated power and the pile-side pre-allocated power by using the method indicated by the following formulas:

$$Pscmd = N \times a + Pswap, \text{ and}$$

$$Pccmd = PL - Pscmd,$$

where Pscmd is the station-side pre-allocated power; N is a number of required batteries; a is a power constant; Pswap is non-charging power consumption of an in-station power consuming device in the battery swap station; Pccmd is the pile-side pre-allocated power; and PL is the power limit.

13. The power control system for the battery charging and swap station according to claim 11, where when the station-side actual allocated power is the station-side total requested power and the pile-side actual allocated power is the difference between the power limit and the station-side total requested power, the power allocation module is further configured to respectively perform, based on the station-side actual allocated power and the pile-side actual allocated power, power allocation on the one or more battery compartments and the number of charging piles in the following manner:
  performing power allocation on each battery compartment based on its compartment-side requested power;
  performing, based on the pile-side actual allocated power, equal power allocation on each charging pile;
  determining whether there is redundancy in a pile-side actual power obtained by each charging pile; and
  if there is redundancy, secondarily allocating a redundant power of the charging pile that has a pile-side actual power with redundancy to the charging pile that has a pile-side actual power without redundancy.

14. The power control system for the battery charging and swap station according to claim 11, where when the pile-side actual allocated power is the pile-side total requested power and the station-side actual allocated power is the difference between the power limit and the pile-side total requested power, the power allocation module is further configured to respectively perform, based on the station-side actual allocated power and the pile-side actual allocated power, power allocation on the one or more battery compartments and the number of charging piles in the following manner:
  performing power allocation on each charging pile based on its pile-side requested power;
  performing, based on the station-side actual allocated power, equal power allocation on each battery compartment;
  determining whether there is redundancy in a compartment-side actual power obtained by each battery compartment; and
  if there is redundancy, secondarily allocating a redundant power of the battery compartment that has a compartment-side actual power with redundancy to the battery compartment that has a compartment-side actual power without redundancy.

15. The power control system for the battery charging and swap station according to claim 11, where when the station-side actual allocated power is the station-side pre-allocated power and the pile-side actual allocated power is the pile-side pre-allocated power, the power allocation module is further configured to respectively perform, based on the station-side actual allocated power and the pile-side actual allocated power, power allocation on the one or more battery compartments and the number of charging piles in the following manner:
  performing, based on the station-side actual allocated power, equal power allocation on each battery compartment;
  determining whether there is redundancy in a compartment-side actual power obtained by each battery compartment;
  if there is redundancy, secondarily allocating a redundant power of the battery compartment that has a compartment-side actual power with redundancy to the battery compartment that has a compartment-side actual power without redundancy;
  performing, based on the pile-side actual allocated power, equal power allocation on each charging pile;
  determining whether there is redundancy in a pile-side actual power obtained by each charging pile; and
  if there is redundancy, secondarily allocating a redundant power of the charging pile that has a pile-side actual power with redundancy to the charging pile that has a pile-side actual power without redundancy.

16. The power control system for the battery charging and swap station according to claim 10, where the power control system further includes:
  a station-side total requested power determination module configured to determine the station-side total requested power of the battery swap station in the following manner:
  obtaining a number N of required batteries;
  selecting N batteries with a highest state of charge from the battery swap station;
  calculating a total charging requested power of the N batteries;
  calculating non-charging power consumption of an in-station power consuming device in the battery swap station; and
  calculating a sum of the total charging requested power and the non-charging power consumption as the station-side total requested power,
  where the number of required batteries is determined based on a reserved battery swap order of the battery swap station.

17. The power control system for the battery charging and swap station according to claim 10, where the obtaining module is further configured to obtain a real-time total power of the battery charging and swap station;
  the comparison module is further configured to compare the real-time total power with the power limit; and
  the power allocation module is further configured to, when the real-time total power is greater than the power limit, control a total power of the battery charging and swap station to be reduced to the power limit.

18. The power control system for the battery charging and swap station according to claim 10, where the obtaining module is further configured to obtain a communication status of the charging pile; and the power allocation module is further configured to allocate, if there is a charging pile in a disconnected state, a preset power to the charging pile; and/or
  the obtaining module is further configured to obtain a communication status of the battery compartment; and the power allocation module is further configured to, if there is a battery compartment in a disconnected state, deactivate the battery compartment and select a battery compartment corresponding to a battery with a highest state of charge from the remaining battery compartments to perform power allocation.

* * * * *